(12) United States Patent
van Rooyen

(10) Patent No.: US 7,263,146 B2
(45) Date of Patent: Aug. 28, 2007

(54) REDUCED-COMPLEXITY ANTENNA SYSTEM USING MULTIPLEXED RECEIVE CHAIN PROCESSING

(75) Inventor: Pieter van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 768 days.

(21) Appl. No.: 10/606,371

(22) Filed: Jun. 24, 2003

(65) Prior Publication Data

US 2004/0234012 A1 Nov. 25, 2004

Related U.S. Application Data

(60) Provisional application No. 60/391,347, filed on Jun. 24, 2002.

(51) Int. Cl.
*H04B 1/00* (2006.01)
*H04B 7/08* (2006.01)
*H04J 11/00* (2006.01)

(52) U.S. Cl. .................. 375/347; 375/148; 370/206; 455/132

(58) Field of Classification Search ............ 375/148, 375/130, 152, 144, 147, 267, 347; 370/203, 370/206, 209, 335, 441; 455/132–139
See application file for complete search history.

(56) References Cited

U.S. PATENT DOCUMENTS

| | | | |
|---|---|---|---|
| 5,528,581 | A | 6/1996 | De Bot |
| 5,887,021 | A | 3/1999 | Keskitalo et al. |
| 6,289,039 | B1 | 9/2001 | Garodnick |
| 6,680,966 | B2 | 1/2004 | Lemois et al. |
| 7,110,381 | B1 * | 9/2006 | O'Sullivan et al. ......... 370/338 |
| 2002/0024975 | A1 | 2/2002 | Hendler |
| 2004/0038651 | A1 * | 2/2004 | Okuhata ..................... 455/130 |

OTHER PUBLICATIONS

PCT/US03/20017—International Search Report or the Declaration mailed Feb. 17, 2004.
Boche, H.; Schubert, M., *Space-time Rake receiver with optimal beamforming for the uplink of CDMA-based wireless systems*, Circuits and Systems, 2000. Proceedings. ISCAS 2000 Geneva. The 2000 IEEE International Symposium on , vol. 3 , 2000, pp. 109-112 vol. 3.
Kun Wang; Hongya Ge, *A space-time receiver for asynchronous DS-CDMA systems based on Kalman filter*, Signals, Systems and Computers, 2000. Conference Record of the Thirty-Fourth Asilomar Conference on , vol. 1 , 2000 pp. 547-551 vol. 1.

* cited by examiner

*Primary Examiner*—Tesfaldet Bocure
(74) *Attorney, Agent, or Firm*—McAndrews, Held & Malloy, Ltd.

(57) ABSTRACT

A method and associated system for processing a plurality of replicas of a signal in a signal processing chain, the method includes receiving each of the plurality of replicas of the signal at one of a corresponding plurality of respective antenna elements and orthogonally multiplexing the replicas of the signal on to a single processing chain. The multiplexed replicas are down converted from RF to baseband and converted from an analog to a digital multiplexed signal. The digital multiplexed replicas are then demultiplexed into a plurality of separate signals that correspond to replicas of the signal received at respective ones of the plurality of antennas. In variations, the orthogonal multiplexing includes frequency spreading the replicas of the signal on the single processing chain in accordance with complex Walsh codes. In other variations, the signal replicas are offset in phase by 90 degrees and time multiplexed on the single processing chain.

45 Claims, 25 Drawing Sheets

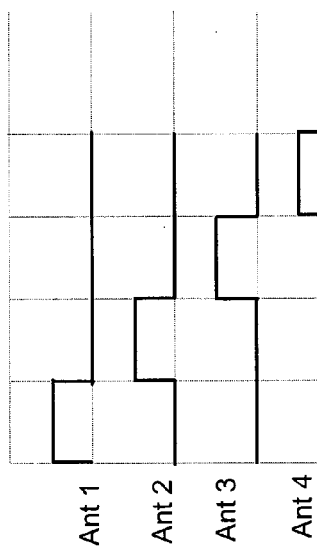
Figure 25A
Figure 25B
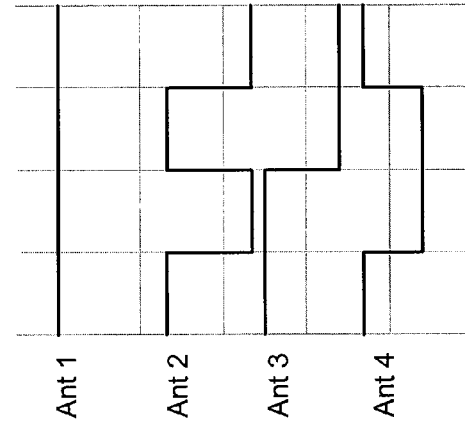
Figure 26A
Figure 26B

REDUCED-COMPLEXITY ANTENNA SYSTEM USING MULTIPLEXED RECEIVE CHAIN PROCESSING

CROSS-REFERENCE TO RELATED APPLICATION

This application claims priority under 35 U.S.C. §119(e) to U.S. Provisional Application No. 60/391,347 entitled REDUCED-COMPLEXITY ANTENNA SYSTEM USING MULTIPLEXED RECEIVE CHAIN PROCESSING, filed Jun. 24, 2002, which is incorporated herein by reference in its entirety.

BACKGROUND OF THE INVENTION

1. Field of the Invention

The present invention relates to an antenna diversity receiver for radio communication systems, and more particularly to a reduced-complexity antenna arrangement disposed to utilize a single processing chain of the associated diversity receiver.

2. Background Information

It has recently been proposed that both the performance and capacity of existing wireless system could be improved through the use of so-called "smart" antenna techniques. In particular, it has been suggested that such techniques, coupled with space-time signal processing, could be utilized both to combat the deleterious effects of multipath fading of a desired incoming signal and to suppress interfering signals. In this way both performance and capacity of digital wireless systems in existence or being deployed (e.g., CDMA-based systems, TDMA-based systems, WLAN systems, and OFDM-based systems such as IEEE 802.11a/g) may be improved.

It is anticipated that smart antenna techniques will be increasingly utilized both in connection with deployment of base station infrastructure and mobile subscriber units (e.g, handsets) in cellular systems in order to address the increasing demands being placed upon such systems. These demands are arising in part from the shift underway from current voice-based services to next-generation wireless multimedia services and the accompanying blurring of distinctions among voice, video and data modes of transmission. Subscriber units utilized in such next-generation systems will likely be required to demonstrate higher voice quality relative to existing cellular mobile radio standards as well as to provide high-speed data services (e.g., as high as 10 Mbits/s). Achieving high speed and high quality of service, however, is complicated because it is desireable for mobile subscriber units to be small and lightweight, and to be capable of reliably operating in a variety of environments (e.g., cellular/microcellular/picocellular, urban/suburban/rural and indoor/outdoor). Moreover, in addition to offering higher-quality communication and coverage, next-generation systems are desired to more efficiently use available bandwidth and to be priced affordably to ensure widespread market adoption.

In many wireless systems, three principal factors tend to account for the bulk of performance and capacity degradation: multipath fading, delay spread between received multipath signal components, and co-channel interference (CCI). As is known, multipath fading is caused by the multiple paths which may be traversed by a transmitted signal en route to a receive antenna. The signals from these paths add together with different phases, resulting in a received signal amplitude and phase that vary with antenna location, direction and polarization, as well as with time (as a result of movement through the environment). Increasing the quality or reducing the effective error rate in order to obviate the effects of multipath fading has proven to be extremely difficult. Although it would be theoretically possible to reduce the effects of multipath fading through use of higher transmit power or additional bandwidth, these approaches are often inconsistent with the requirements of next-generation systems.

As mentioned above, the "delay spread" or difference in propagation delays among the multiple components of received multipath signals has also tended to constitute a principal impediment to improved capacity and performance in wireless communication systems. It has been reported that when the delay spread exceeds approximately ten percent (10%) of the symbol duration, the resulting significant intersymbol interference (ISI) generally limits the maximum data rate. This type of difficulty has tended to arise most frequently in narrowband systems such as the Global System for Mobile Communication (GSM).

The existence of co-channel interference (CCI) also adversely affects the performance and capacity of cellular systems. Existing cellular systems operate by dividing the available frequency channels into channel sets, using one channel set per cell, with frequency reuse. Most time division multiple access (TDMA) systems use a frequency reuse factor of 7, while most code division multiple (CDMA) systems use a frequency reuse factor of 1. This frequency reuse results in CCI, which increases as the number of channel sets decreases (i.e., as the capacity of each cell increases). In TDMA systems, the CCI is predominantly from one or two other users, while in CDMA systems there may exist many strong interferers both within the cell and from adjacent cells. For a given level of CCI, capacity can be increased by shrinking the cell size, but at the cost of additional base stations.

The impairments to the performance of cellular systems of the type described above may be at least partially ameliorated by using multi-element antenna systems designed to introduce a diversity gain into the signal reception process. There exist at least three primary methods of effecting such a diversity gain through decorrelation of the signals received at each antenna element: spatial diversity, polarization diversity and angle diversity. In order to realize spatial diversity, the antenna elements are sufficiently separated to enable low fading correlation. The required separation depends on the angular spread, which is the angle over which the signal arrives at the receive antennas.

In the case of mobile subscriber units (e.g, handsets) surrounded by other scattering objects, an antenna spacing of only one quarter wavelength is often sufficient to achieve low fading correlation. This permits multiple spatial diversity antennas to be incorporated within a handset, particularly at higher frequencies (owing to the reduction in antenna size as a function of increasing frequency). Furthermore, dual polarization antennas can be placed close together, with low fading correlation, as can antennas with different patterns (for angle or direction diversity). However, each antenna element deployed in a wireless handset requires a separate chain of signal processing electronics, which increases the cost and power consumption of the handset.

SUMMARY OF THE INVENTION

In one embodiment, the invention can be characterized as a method, and means for accomplishing the method, of receiving a signal, the method including the steps of: receiving each of a plurality of replicas by one of a corresponding plurality of antenna elements so as to thereby generate a plurality of received signal replicas; orthogonally multiplexing the plurality of received signal replicas into a multiplexed signal provided to a single processing chain; and transforming, within the single processing chain, the multiplexed signal into a plurality of separate signals that each corresponds to one of the replicas of the signal.

In variations, orthogonal multiplexing is carried out according to a complex Walsh coding scheme. In other variations, respective switching signals to multiplex the signal replicas are offset from each other by 90 degrees.

In another embodiment the invention can be characterized as a method for receiving a signal including the steps of: receiving each of a multiplicity of replicas of the signal by one of a corresponding multiplicity of antenna elements so as to thereby generate a multiplicity of received signal replicas; switching signal energy from among ones of a first subset of the multiplicity of antenna elements to create a first signal comprising signal energy from each of the ones of the first subset of the multiplicity of antenna elements; switching signal energy from among ones of a second subset of the multiplicity of antenna elements to create a second signal comprising signal energy from each of the ones of the second subset of the multiplicity of antenna elements; offsetting, in phase, the second signal from the first signal; combining the second signal with the first signal thereby forming a multiplexed signal comprising information representative of each respective replica of the signal; and transforming, within the single processing chain, the multiplexed signal into separate signals wherein each of the separate signals corresponds to one of the replicas of the signal.

In a further embodiment, the invention can be characterized as an apparatus for receiving a signal, the apparatus comprising: a plurality of antenna elements spatially arranged to receive one of a corresponding plurality of replicas of the signal so as to be capable of generating a plurality of received signal replicas; a signal processing chain; and an orthogonal multiplexer, coupled between the plurality of antenna elements and the signal processing chain, wherein the orthogonal multiplexor is configured to receive the plurality of received signal replicas and orthogonally multiplex the plurality of received signal replicas as a multiplexed signal on to the signal processing chain. The signal processing chain includes a demultiplexer configured to transform the multiplexed signal into a plurality of separate signals, wherein each of the plurality of separate signals corresponds to one of the replicas of the signal.

In yet another embodiment, the invention may be characterized as a method for orthogonally multiplexing a signal, the method comprising steps of: generating a plurality of orthogonal signals; multiplying each of the plurality of orthogonal signals by one of a corresponding plurality of replicas of the signal so as to thereby generate a plurality of coded signal replicas, wherein each of the plurality of replicas of the signal is received by one of a corresponding plurality of antenna elements; and combining the plurality of coded signal replicas to form a orthogonally multiplexed signal.

BRIEF DESCRIPTION OF THE DRAWINGS

In the accompanying drawings:

FIGS. 25A and 25B are a complex Walsh coding matrix and associated timing diagram, according to one embodiment, utilized to provide switching signals to the mixers of the antenna-processing module of FIG. 24; and FIGS. 26A and 26B are a complex Walsh coding matrix and associated timing diagram, according to another embodiment embodiment, utilized to provide switching signals to the mixers of the antenna-processing module of FIG. 24.

DETAILED DESCRIPTION OF THE INVENTION

Figure 1:
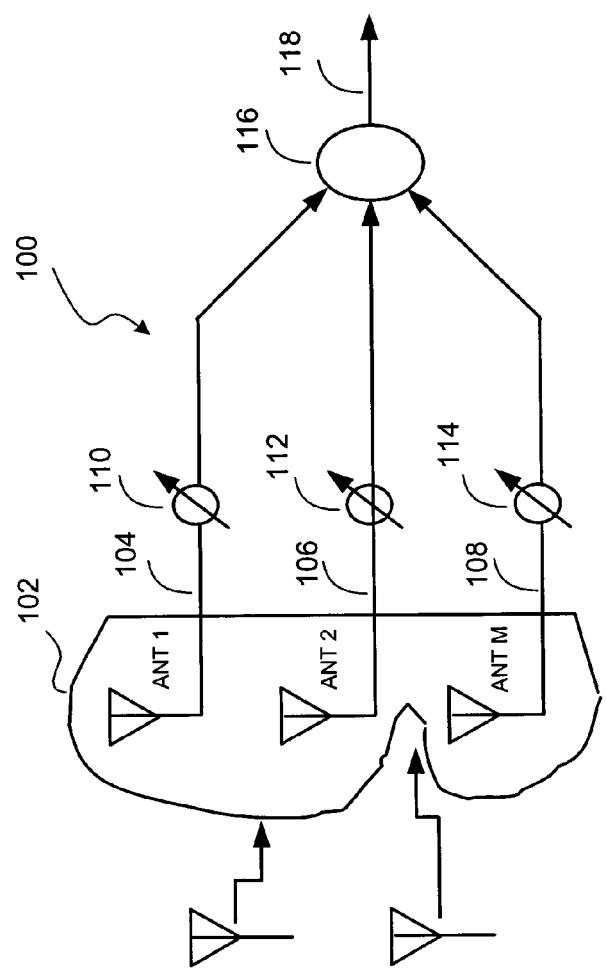
FIG. 1 is a block diagram of a conventional diversity receiver in which the signals received by multiple antenna elements are weighted and combined in order to generate an output signal.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Various operations will be described as multiple discrete steps performed in turn in a manner that is most helpful in understanding the present invention, however, the order of description should not be construed as to imply that these operations are necessarily order dependent, in particular, the order the steps are presented. Furthermore, the phrase "in one embodiment" will be used repeatedly, however the phrase does not necessarily refer to the same embodiment, although it may.

In order to configure a mobile device to process signals from multiple antenna elements, the cost and power consumption of the associated electronics within the device should desirably be capable of implementation in a cost-effective manner. In this regard the present invention is directed to a system and method for implementing multiple antenna elements within mobile devices in a manner that potentially reduces costs, which typically accompany multi-element antenna arrangements. The present invention is not limited to mobile devices and may also be applied to infrastructure elements (e.g., base stations and access points). In addition, the present invention is applicable to nearly all known wireless standards and modulation schemes (e.g., GSM, CDMA2000, WCDMA, WLAN, fixed wireless standards, OFDM and CDMA). As will be described below, various advantages offered by the present invention derive from the multiplexing of the signals received from a number of antenna elements onto a common receive chain processing path in order to reduce overall power consumption and cost.

For example, the present invention according to several embodiments provides a reduced-complexity, plural-element antenna arrangement and associated receiver design capable of being implemented at low cost. In some embodiments, the antenna arrangement and receiver design does not materially increase power consumption relative to single-element approaches, thereby rendering it particularly suitable for implementation within wireless handsets.

In accordance with one aspect of the invention, samples from plural antenna elements are time-multiplexed onto a single RF processing path using orthogonal switching functions. Demultiplexing is then performed in the digital domain along with channel selection and spatial and time processing.

In order to facilitate appreciation of the principals of the invention, a brief overview of various conventional multi-element antenna systems designed to mitigate delay spread, interference and fading effects is provided with reference to FIGS. 1–4.

Referring first to FIG. 1, shown is a block diagram of a conventional diversity receiver 100 in which the signals received by multiple antenna elements are weighted and combined in order to generate an output signal. Shown in the conventional diversity receiver 100 are a collection of M antenna elements 102, and coupled with each respective antenna element are parallel receive chains 104, 106, 108 that include respective weighting portions 110, 112, 114. The receive chains 104, 106, 108 all couple with a combiner 116 and a combined single 118 exits from the combiner 116.

With M antenna elements, such an array generally provides an increased antenna gain of "M" as well as a diversity gain against multipath fading dependent upon the correlation of the fading among the antenna elements. In this context the antenna gain is defined as the reduction in required receive signal power for a given average output signal-to-noise ratio (SNR), while the diversity gain is defined as the reduction in the required average output SNR for a given bit error rate (BER) with fading.

For interference mitigation, each of the M antenna elements 102 are weighted at the respective weighting portions 110, 112, 114 and combined in the combiner 116 to maximize signal-to-interference-plus-noise ratio (SINR). This weighting process is usually implemented in a manner that minimizes mean squared error (MMSE), and utilizes the correlation of the interference to reduce the interference power.

Figure 2:
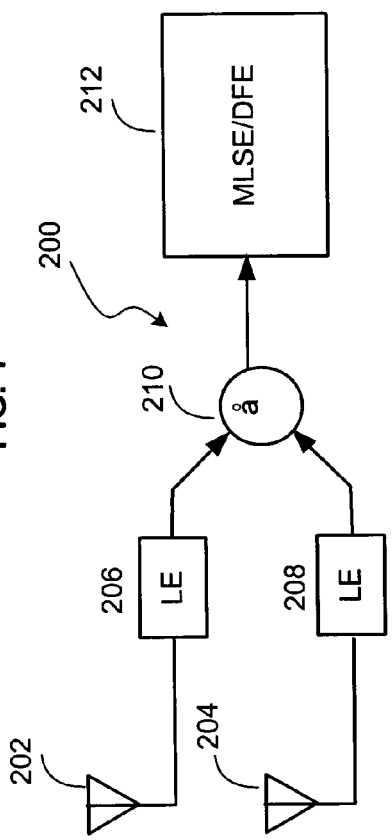
FIG. 2 is a block diagram of a conventional spatial-temporal (ST) filtering arrangement.

Turning now to FIG. 2, a block diagram is shown of a conventional spatial-temporal (ST) filtering arrangement 200. Shown are a first antenna 202 and a second antenna 204 respectively coupled to a first linear equalizer 206 and a second linear equalizer 208. Outputs of each of the first and second linear equalizers 206, 208 are coupled to a combiner 210, and an output of the combiner 201 is coupled to an MLSE/DFE portion 212.

The filtering arrangement of FIG. 2 is designed to eliminate delay spread using joint space-time processing. In general, since the CCI is unknown at the receiver, optimum space-time (ST) equalizers, either in the sense of a minimum mean square error (MMSE) or maximum signal-to-interference-plus-noise ratio (SINR), typically include a whitening filter, e.g. linear equalizers (LE) 206, 208 that whitens the CCI both spatially and temporally, and the filtering arrangement of FIG. 2 is typical of such systems. As shown in FIG. 2, the linear equalizers (LE) 206, 208 are followed by a non-linear filter that is represented by the MLSE/DFE portion 212, which is implemented using either a decision feedback equalizer (DFE) or maximum-likelihood sequence estimator (MLSE).

As is known to one of ordinary skill in the art, the turbo principle can also be used to replace the non-linear filters with superior performance, but higher computational complexity. Using ST processing (STP) techniques, SNR gains of up to 4 dB and SINR gains of up to 21 dB has been reported with a modest number of antenna elements.

Figure 3:
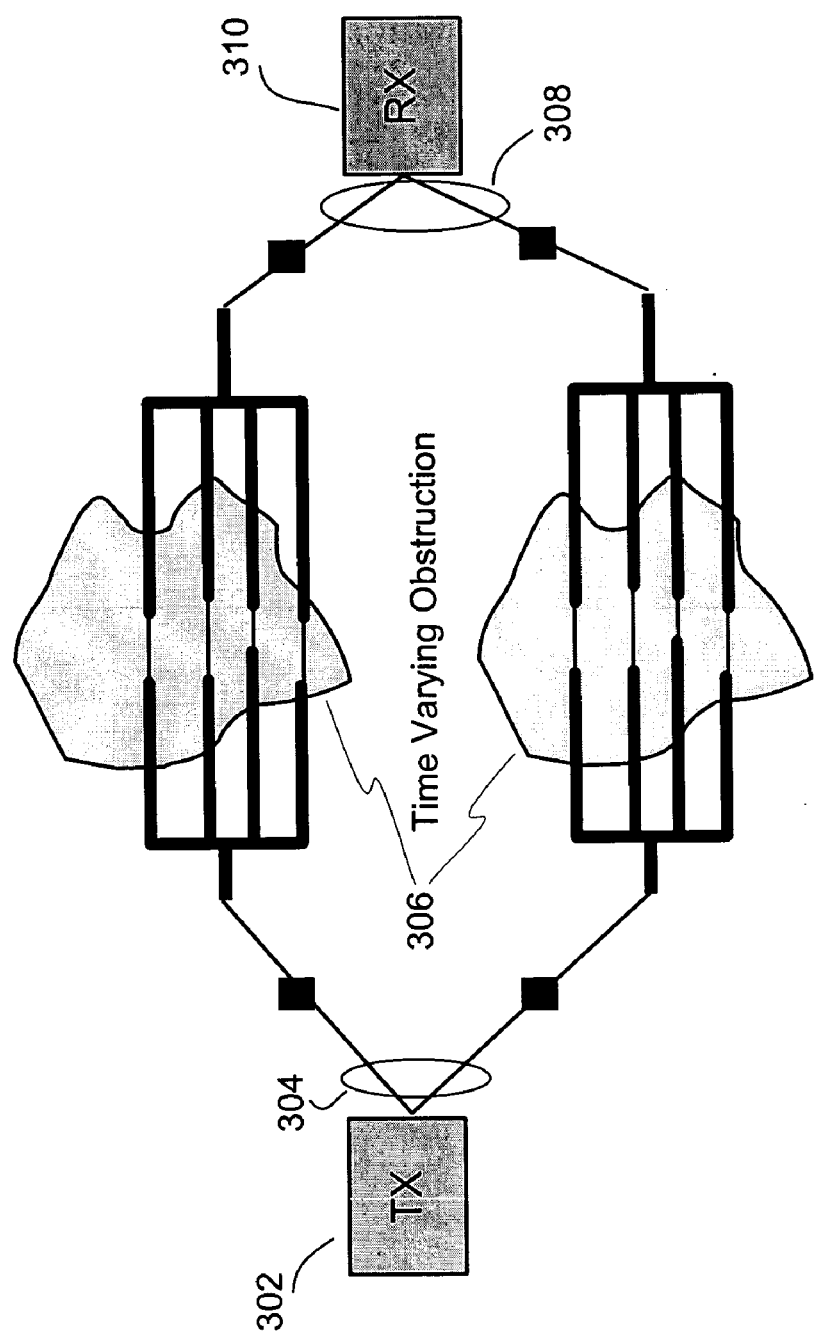
FIG. 3 is a representation of a multiple-input/multiple-output antenna arrangement within a wireless communication system.

Referring next to FIG. 3, shown is a generic representation of a multiple-input/multiple-output antenna arrangement within a wireless communication system. Shown are a transmitter (TX) 302 coupled to multiple transmit antennas 304, and the multiple transmitter antennas 304 are shown transmitting a signal via time varying obstructions 306 to multiple receive antennas 308 that are coupled to a receiver (RX) 310. As shown, multiple antenna elements are deployed at both the transmitter (TX) 302 and receiver (RX) 310 of the wireless communication system.

In addition to multiple-input/multiple-output antenna (MIMO) arrangements, other antenna arrangements may be categorized, based upon the number of "inputs" and "outputs" to the channel linking a transmitter and receiver, as follows:

Single-input/single-output (SISO) systems, which include transceivers (e.g., mobile units and a base station) with a single antenna for uplink and down link communications.

Multi-input/single-output (MISO) systems, which include one or more receivers, which downlink via multiple antenna inputs, and one or more transmitters, which uplink via a single antenna output.

Single-input/multi-output (SIMO) systems, which include one or more receivers, which downlink via a single antenna input, and one or more transmitters, which uplink via multiple antenna outputs.

One aspect of the attractiveness of multi-element antenna arrangements, particularly MIMOs, resides in the significant system capacity enhancements that can be achieved using these configurations. Assuming perfect estimates of the applicable channel at both the transmitter and receiver are available, in a MIMO system with M receive antennas the received signal decomposes to M independent channels. This results in an M-fold capacity increase relative to SISO systems. For a fixed overall transmitted power, the capacity offered by MIMOs scale with increasing SNR for a large, but practical, number of M of antenna elements.

In the particular case of fading multipath channels, it has been found that the use of MIMO arrangements permits capacity to be scaled by nearly M additional bits/cycle for each 3-dB increase in SNR. This MIMO scaling attribute is in contrast to a baseline configuration, characterized by M=1, which by Shannon's classical formula scales as one more bit/cycle for every 3-dB of SNR increase. It is noted that this increase in capacity that MIMO systems afford is achieved without any additional bandwidth relative to the single element baseline configuration.

However, widespread deployment of multi-element antenna arrangements in wireless communication systems (particularly within wireless handsets) has been hindered by the resultant increase in complexity and associated increased power consumption, cost and size. These parameter increases result, at least in part, from a requirement in many proposed architectures that a separate receiver chain be provided for each for each antenna element.

Figure 4:
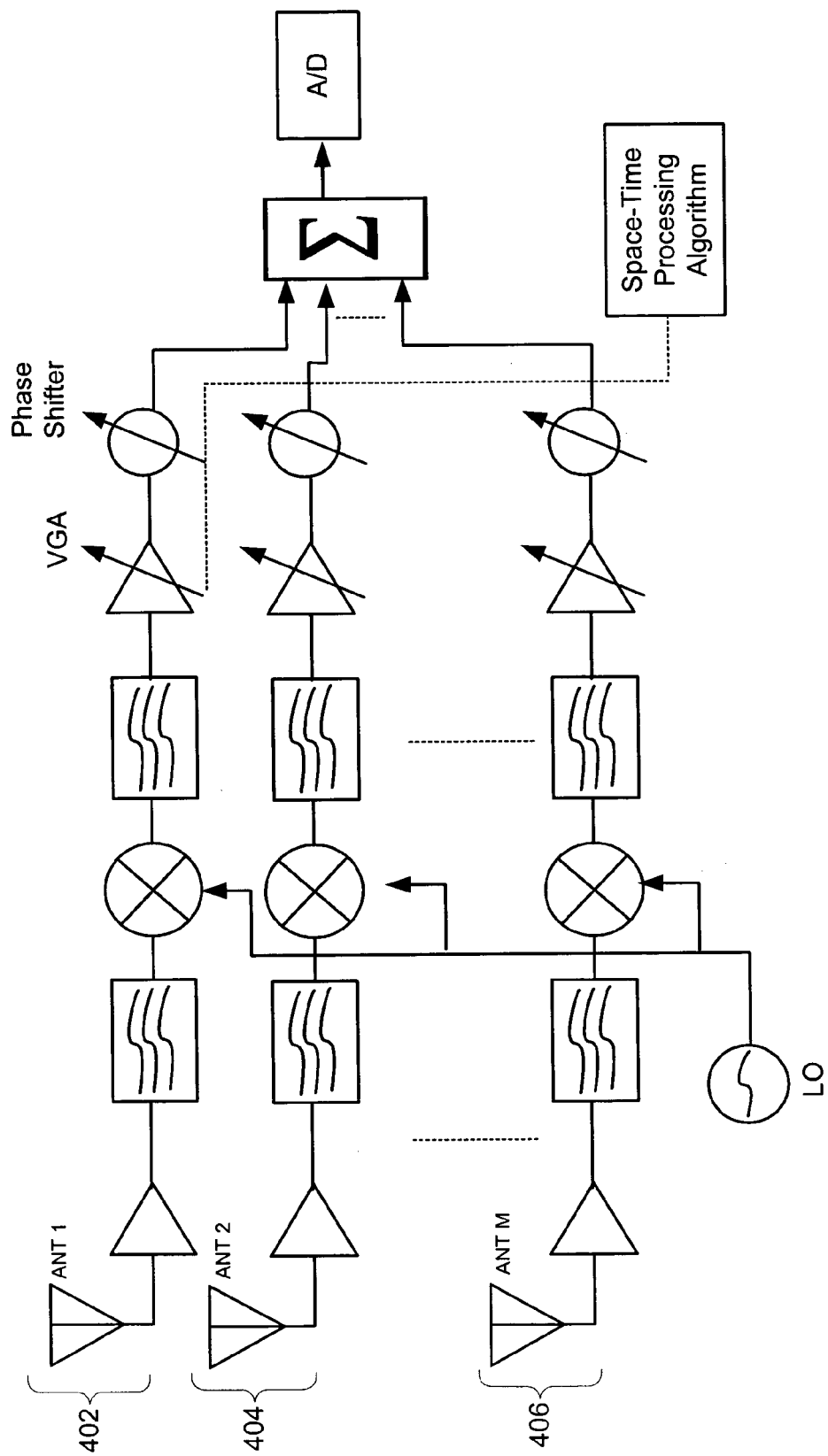
FIG. 4 is a block diagram depicting a conventional architecture of a multiple receive antenna system in the RF domain.

For example, FIG. 4 depicts one conventional architecture of a multiple receive antenna system in the RF domain. As shown, the implementation of FIG. 4 includes a separate receive chain 402, 404, 406 for each of M antenna elements, and each receive chain 402, 404, 406 includes elements to perform amplification, filtering and mixing. As a consequence, the cost of implementing a system with this architecture is higher than a system with a single receive chain.

This approach is further disadvantageous because analog phase shifters and variable gain amplifiers are utilized, which renders it relatively expensive and susceptible to performance degradation as a result of aging, temperature variation, and deviation from prescribed tolerances. In addition, because the implementation of FIG. 4 makes use of a phase relationship between the received and transmitted antenna elements (i.e., the path differential delay is maintained throughout each receive processing chain), rigid adherence to tolerances and accurate calibration is required in each RF processing chain.

Figure 5:
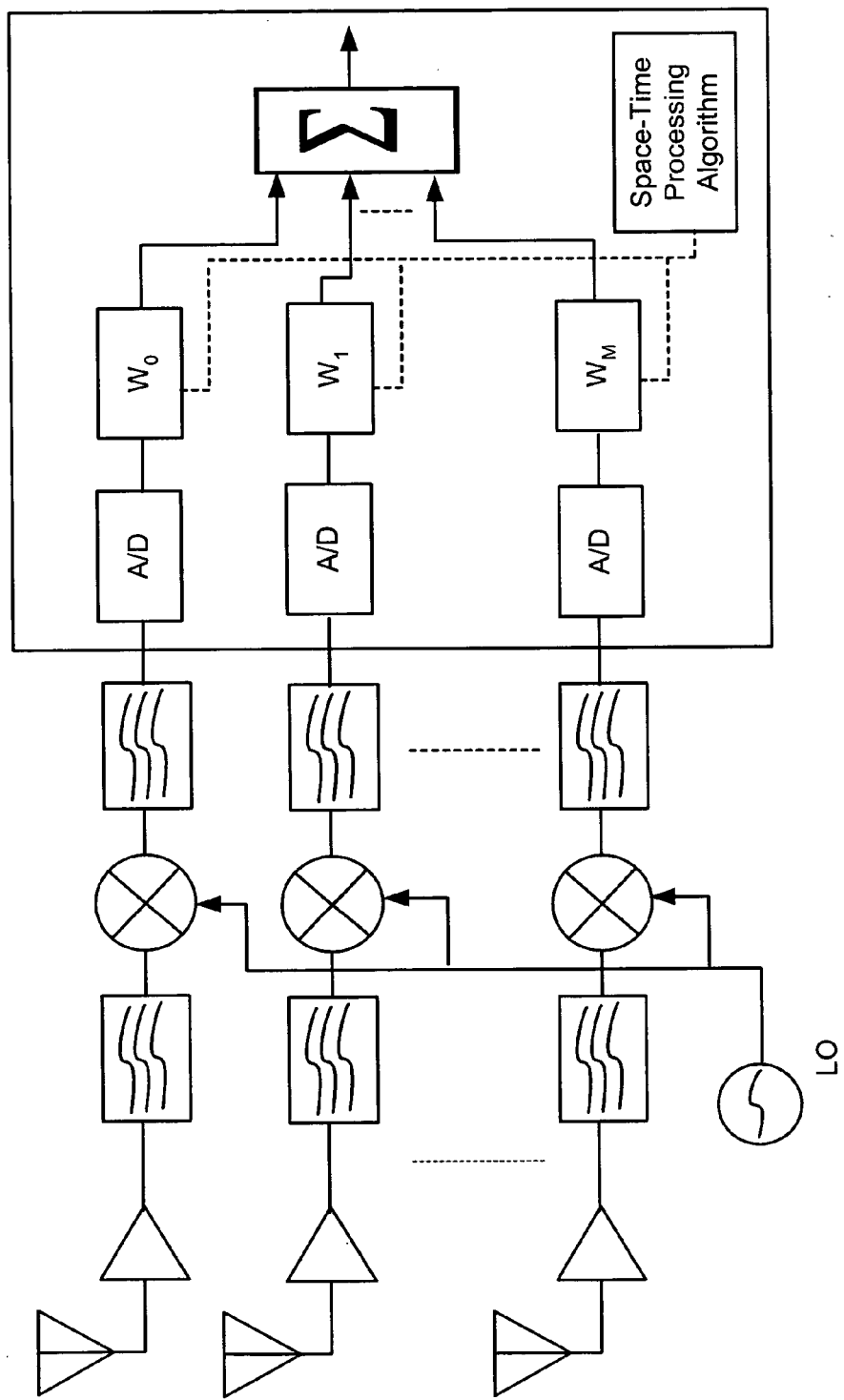
FIG. 5 is a block diagram representing a digital equivalent to the circuit of FIG. 4.

Referring next FIG. 5, shown is a block diagram representing a digital equivalent to the circuit of FIG. 4. In general, the performance of the digital circuit arrangement of FIG. 5 is degraded for substantially the same reasons as was described above with reference to FIG. 4. That is, the duplication of the entire receiver chain (i.e., from RF to baseband) associated with each antenna element leads to an increase in size, cost, complexity and power consumption relative to single antenna approaches. As a result, multi-element antenna configurations have heretofore been unsuitable for deployment in the handsets and other mobile terminals used within wireless communication systems.

Overview and System Architecture

As is described in further detail below, several embodiments of the reduced-complexity antenna arrangement and receiver of the present invention are premised on consolidating the RF processing operations associated with each antenna element into a single processing chain, and in some embodiments RF processing operations are consolidated into a single processing chain as soon as is practicable.

In some embodiments, this consolidation is achieved by multiplexing samples from a switch element connected to a pair of antenna elements onto a single RF processing chain. Upon completion of the RF processing effected by this single RF chain, the incident signals are passed through matched filters operative to reduce the applicable sample frequency to the appropriate base band rate. Upon recovery of the signals initially received by each antenna element in the digital domain, the recovered signals are then subjected to conventional spatial processing. The structure may be generalized for use with more than a pair of antenna elements by modifying the structure of the multiplexer/demultiplexer and the sample spacing of the signal streams provided to the matched filters associated with each antenna element.

Figure 6:
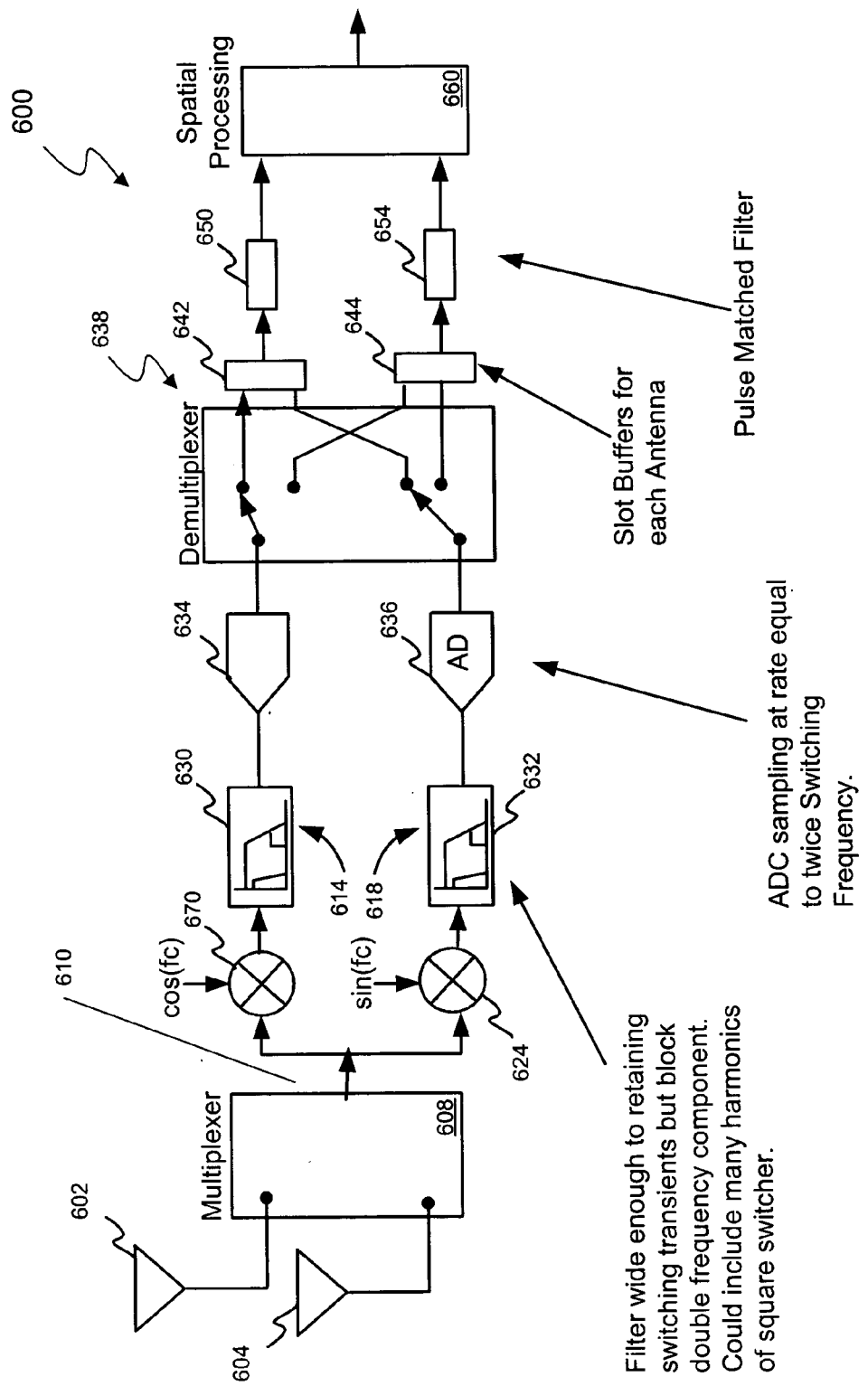
FIG. 6 is a block diagram of a plural-element antenna processing module in accordance with one embodiment of the present invention.

FIG. 6 is a block diagram, which illustratively represents a receiver front end incorporating a plural-element antenna processing module 600 in accordance with one embodiment of the present invention. The plural-element antenna processing module 600 includes first and second antenna elements 602 and 604 coupled through a multiplexer switch 608 to an RF processing chain 610. While referring to FIG. 6, simultaneous reference will be made to FIG. 7, which is a flowchart illustrating steps carried out by the plural-element antenna processing module 600 according to one embodiment of the present invention.

In operation, the first and second antenna elements 602 and 604 initially receive a signal from two spatially distinct locations. Thus, replicas of the signal are received at each of the first and second antenna elements 602 and 604 (Step 702). In several embodiments, the replicas received at the first and second antenna elements 602 and 604 are uncorrelated replicas of the signal.

Each of the replicas of the signal received at the first and second antenna elements 602 and 604 are then orthogonally multiplexed on to the processing chain 610 (Step 704). In some embodiments, the orthogonal multiplexing is carried out by multiplying one replica of the signal received (e.g., at the first antenna 602) by a first switching signal, and multiplying another replica of the signal received (e.g., at the second antenna 604) by a second switching signal, which is 90 degrees out of phase with the first switching signal.

Figure 23:
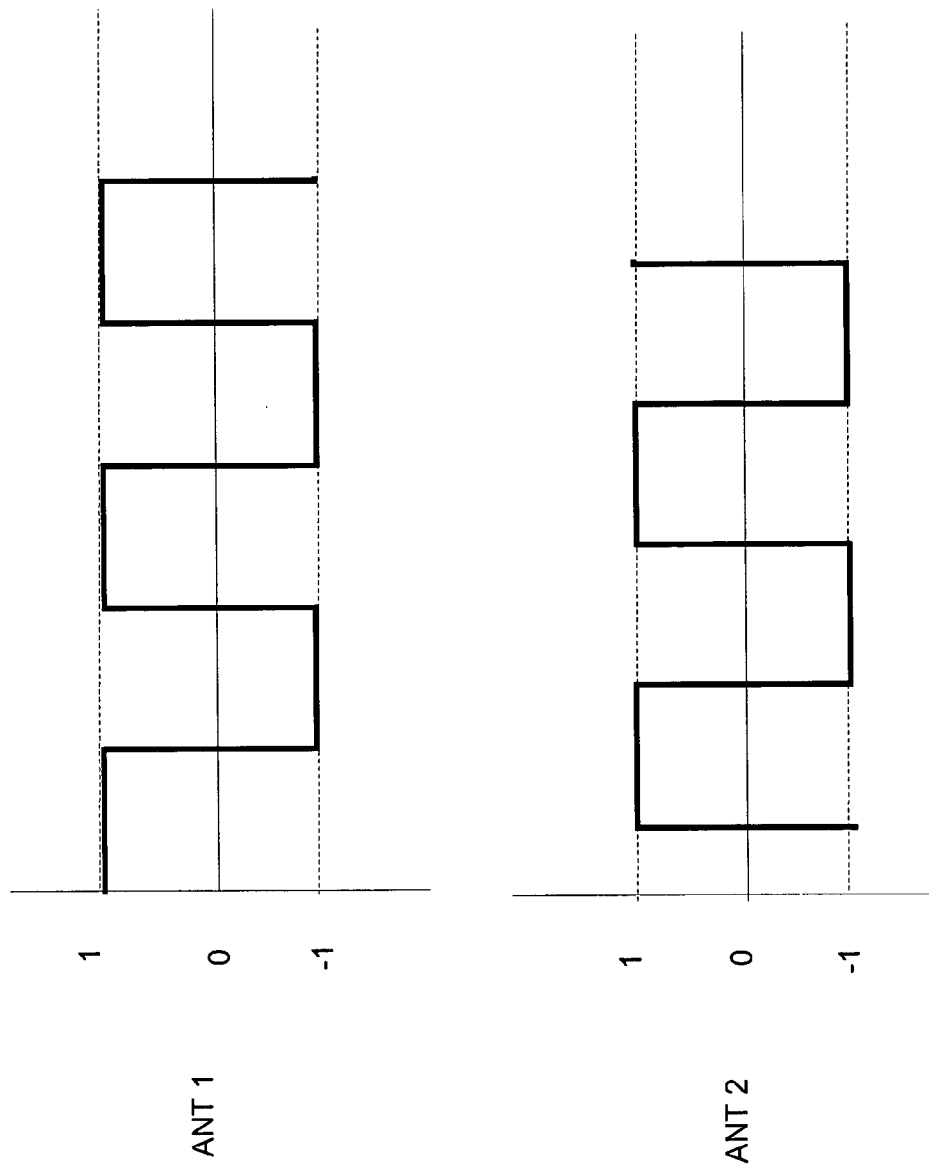
FIG. 23 is a timing diagram of switching signals applied to two of the antenna elements of FIGS. 6 and 21 according to one embodiment.

Referring briefly to FIG. 23, shown are two square waves, out of phase by 90 degrees, which are exemplary of square waves used as switching signals to multiply received replicas of the signal received at the first and second antennas 602, 604 according to one embodiment. As shown in FIG. 23, each of the square waves reverses polarity during each cycle. It should be recognized, however, that switching-square waves need not reverse polarity during each cycle, but by employing square waves that reverse polarity during each cycle (i.e., that more closely resemble a sin wave), fewer harmonics are produced during the multiplexing process, and as a consequence, less rigorous filtering of the multiplexed signal is required.

Figure 24:
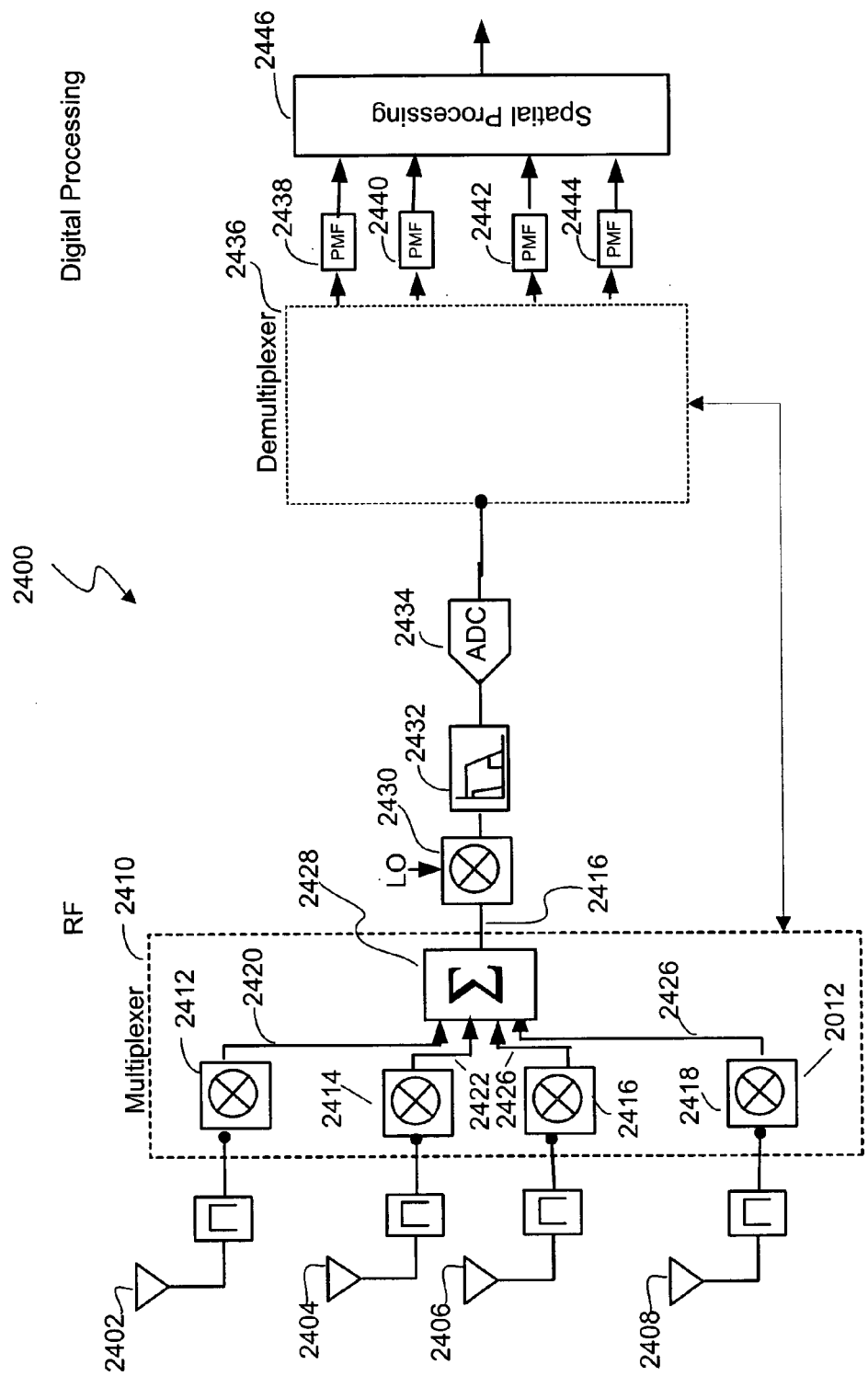
FIG. 24 is yet another embodiment of an antenna-processing module configured to operate with more than two antenna elements.

In other embodiments, as discussed further with reference to FIGS. 24 and 25, the frequency spreading is performed in accordance with complex Walsh coding principals.

As one of ordinary skill in the art recognizes, the multiplexer 608 may be implemented using various combinations of hardware and software/firmware. In one embodiment, for example, a single-pole double-throw (SPDT) switch is utilized in connection with frequency-offset techniques to orthogonally multiplex replicas of a signal. Alternatively, as discussed further with respect to FIG. 24, mixers are implemented to providing switching signals to the replicas of the received signal.

Figure 8A:
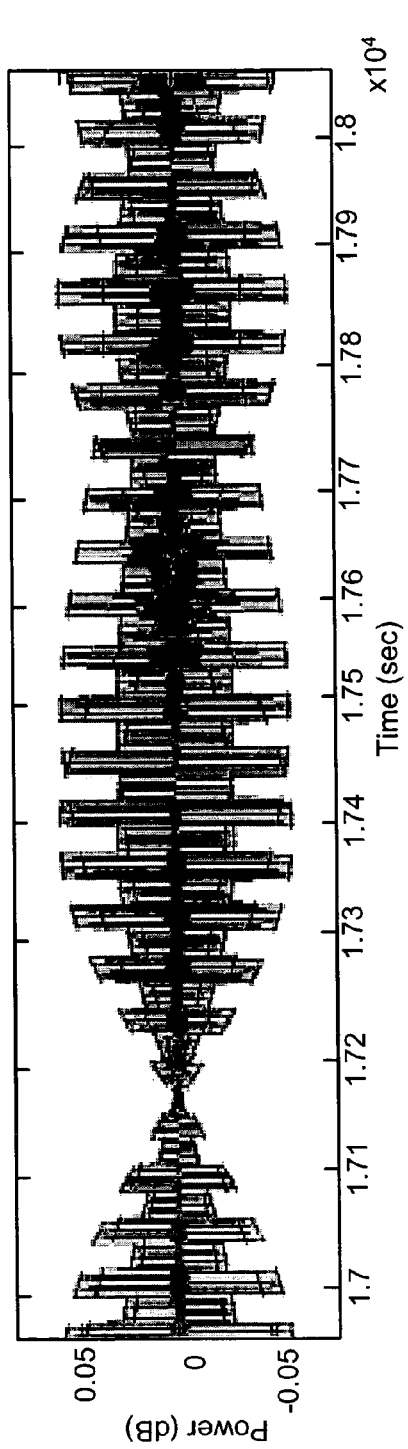
FIGS. 8A and 8B are graphs illustratively representing an output of the multiplexing switch of the plural-element antenna processing module of FIG. 6 in both the time domain and the frequency domain respectively according to one embodiment.
Figure 8B:
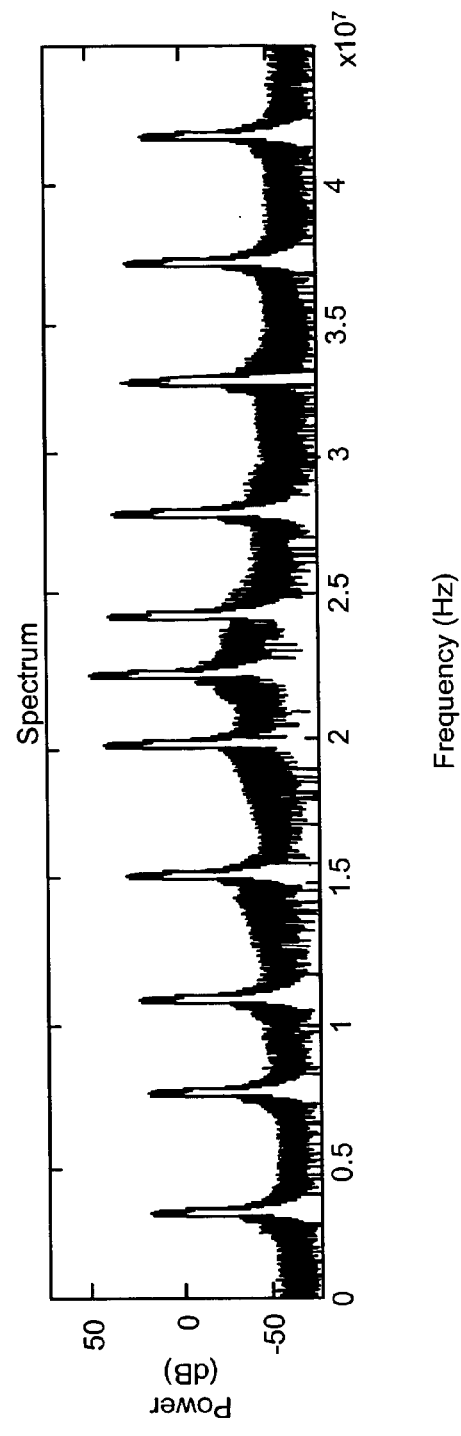

Referring briefly to FIGS. 8A and 8B, shown are representations of the output of the multiplexing switch 608 in both the time domain and the frequency domain respectively for an exemplary embodiment, in which replicas of the signal are not phase offset and the fundamental tone required to implement the oscillation of the switching process is offset from the carrier fc by 218 kHz. In the time domain representation of FIG. 8A, the time-multiplexing of the signals received from the first and second antenna elements 602, 604 upon RF processing chain 610 is evident and makes apparent that the received signals differ primarily only in amplitude in this example. The spreading of the signal received by the antenna elements 602, 604 due to the operation of the multiplexing switch 608 is made apparent by the power spectrum plot in FIG. 8B. Higher order harmonics are also apparent in the power spectrum plot of FIG. 8B, and in general only the centre frequency and each of these 218 kHz offsets are passed into the ADCs 634, 636.

Mathematically, multiplexing may be represented as an application of switching signals s1(t) and s2(t) to the signal energy r1(t) received by the first antenna element 602 "Ant 1" and to the signal energy r2(t) received by the second antenna element 604 "Ant 2" results in:

$$m(t)=r1(t)s1(t)+r2(t)s2(t)$$

where
s1(t)=1+cos(2πfs/2t)
s2(t)=1+cos(2πfs/2t+π)
r1(t)=sin(2πfct+p1(t))
r2(t)=sin(2πfct+p2(t))
p1(t)=base band phase process as received on Ant 1
p2(t)=base band phase process as received on Ant 2

It is noted that in the above mathematical representation a sin waveform rather than a square waveform is utilized as the switching function. As a result, calculations are simplified because of the lower harmonic content of sinusoidal waveforms relative to square waveforms.

As previously discussed, in several embodiments, switching signals (e.g., square waves) that reverse polarity during each cycle are used to more closely approximate a sin waveform. This substantially reduces or eliminates spurious harmonic energy that is potentially produced.

Returning again to the mathematical representation, an expansion of m(t) yields:

$$m(t) = r1(t) + r2(t) + \\ \sin(2\pi(fc - fs/2)t + p1(t))/2 + \\ \sin(2\pi(fc - fs/2 + \pi)t + p2(t))/2 + \\ \sin(2\pi(fc + fs/2)t + p1(t))/2 + \\ \sin(2\pi(fc + fs/2 + \pi)t + p2(t))/2$$

The spectrum of the signal m(t) appears as a centre peak at the carrier frequency fc, and has identical side lobes offset by fs/2 on either side of fc.

In one exemplary embodiment, the multiplexer 608 switches at a rate of at least twenty (20) times the symbol rate of the information received by the antenna elements 602 and 604. However, in alternate embodiments, the switching rate of the orthogonal multiplexor 608 ranges from approximately twice the applicable symbol rate to larger than 20 times such rate.

Next, the multiplexed signal from the multiplexer 608 is down converted from RF frequency (Step 706). On of ordinary skill in the art will recognize that a single one of the side lobes discussed above contains the sum of the two signals of interest with a phase offset of π radians, and one side lobe reduces the applicable expression to the sum of two sinusoids offset in phase:

$$\sin(2\pi(fc-fs/2)t+p1(t))/2+\sin(2\pi(fc-fs/2+\pi)t+p2(t))/2$$

When p1(t)=p2(t), however, then this component is zero and is not of practical utility. Thus, in several embodiments, because m(t) is the signal of interest, the received signal energy is mixed down at the carrier frequency.

In one embodiment, as shown in FIG. 6 for example, the RF processing chain 610 includes an in-phase (I) branch 614 and a quadrature-phase (Q) branch 618 which respectively include a first mixer device 620 and a second mixer device 624. As shown, the first mixer device 620 is supplied with a mixing signal cos(fc), where fc denotes the frequency of the received carrier signal. Similarly, the second mixer device 624 is supplied with the mixing signal sin(fc). The mixer devices 620 and 624 function to mix down the received signal energy at the carrier frequency fc, which results in generation of a center peak at DC and a pair of side lobes "folded" on top of each other at the one half of the switching frequency (fs/2) of the multiplexing switch 608.

As shown in FIG. 6, the signal energy from the first mixer device 620 and the second mixer device 624 is provided to a first low-pass filter 630 and a second low-pass filter 632 respectively, and in one embodiment, the signal energy in both the in-phase (I) branch 614 and the quadrature-phase (Q) branch 618 is filtered at a cut-off of fs.

After low pass filtering at a cut-off of fs (which leaves s1(t) and s2(t) intact), the I and Q components of m(t) are obtained as follows:

$$m\_b\_I(t) = m(t) * \cos(2\pi fct)$$
$$= s1(t)r1(t)\cos(2\pi fct) + s2(t)r2(t)\cos(2\pi fct)$$
$$= s1(t)\sin(p1(t)) + s2(t)\sin(p2(t))$$
$$m\_b\_Q(t) = m(t) * \sin(2\pi fct)$$
$$= s1(t)r1(t)\sin(2\pi fct) + s2(t)r2(t)\sin(2\pi fct)$$
$$= s1(t)\cos(p1(t)) + s2(t)\cos(p2(t))$$

These results are desirable because the function s1(t) and s2(t) may be regarded as being of square form.

Figure 9:
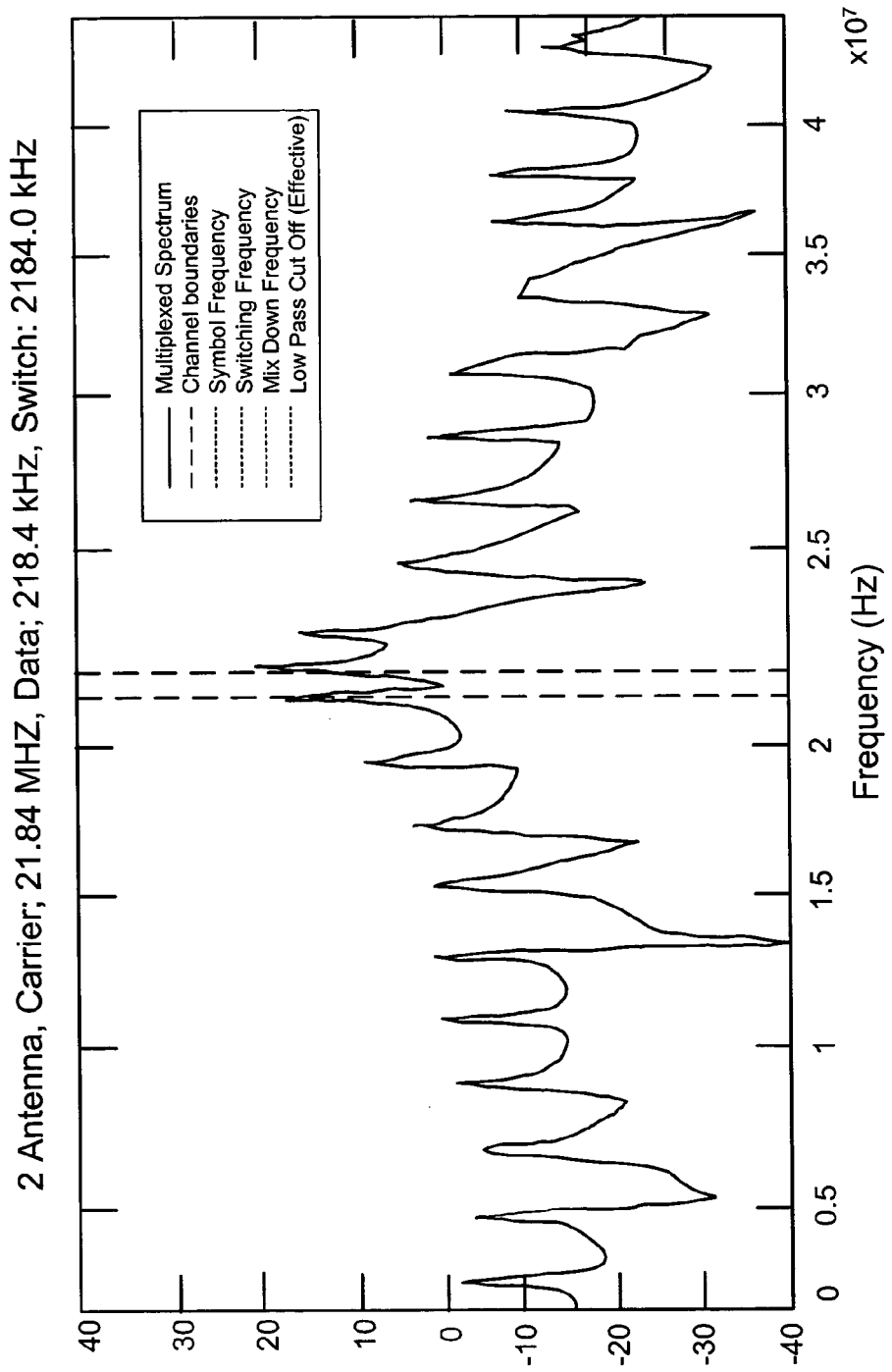
FIG. 9 is a graph representing a signal waveform appearing at the output of the multiplexing switch of the plural-element antenna processing module of FIG. 6 according to one embodiment.
Figure 10:
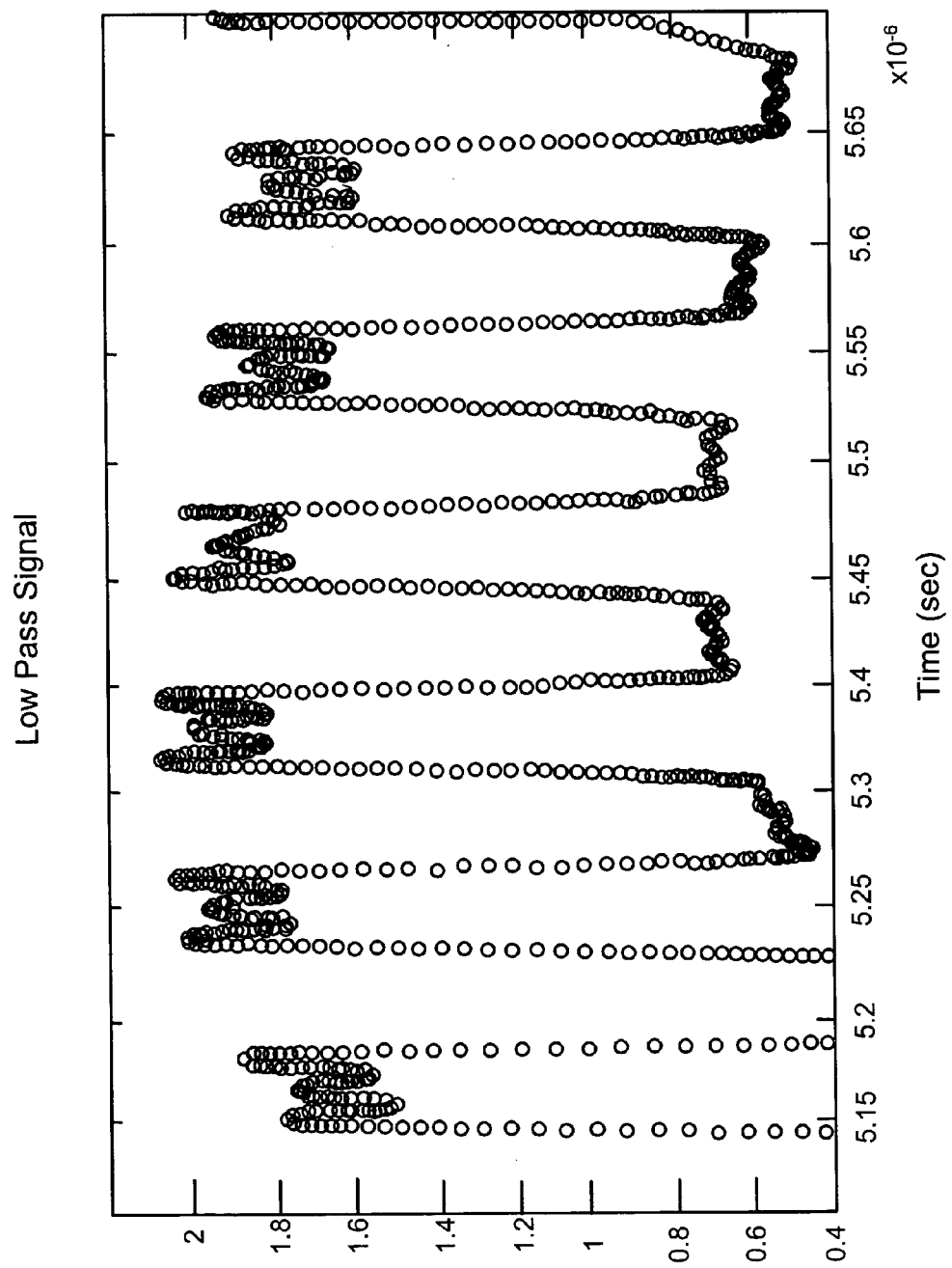
FIG. 10 is a graph depicting an output of one of the low-pass filters of the plural-element antenna processing module of FIG. 6 when the switching tone and a next harmonic are admitted.
Figure 11:
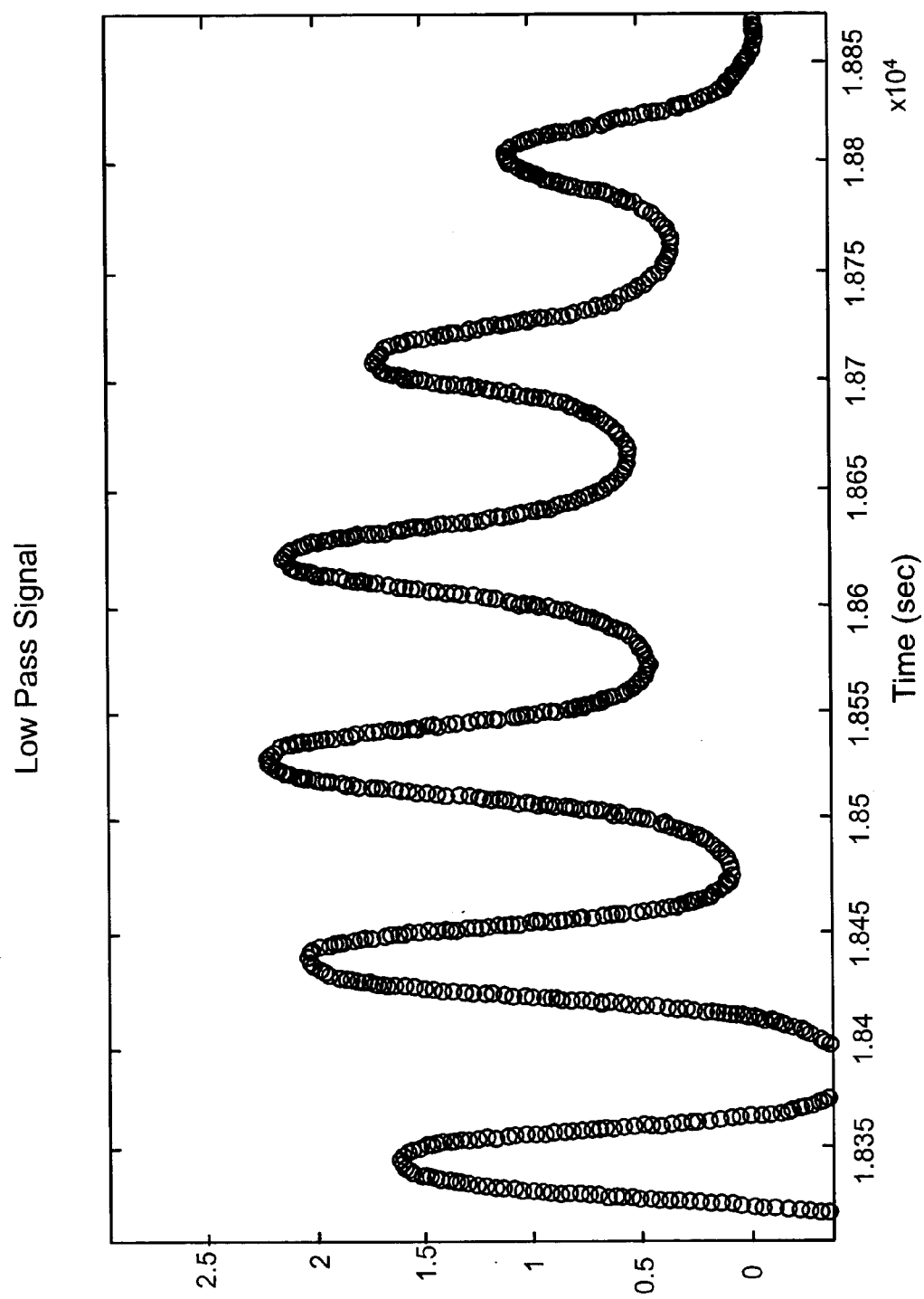
FIG. 11 is a graph depicting an output of one of the low-pass filters of the plural-element antenna processing module of FIG. 6 when only the fundamental switching tone is admitted.

FIGS. 9–11 provide exemplary representations of various signals existing proximate the low-pass filters 630 and 632. Specifically, FIG. 9 represents a signal waveform appearing at the output of the multiplexing switch 608 prior to filtering by one of the low-pass filters 630 and 632.

FIG. 10 depicts the output of one of the low-pass filters 630 and 632 in the case where the switching tone and the next harmonic are admitted.

In contrast, FIG. 11 represents the signal appearing at the output of one of the low-pass filters in the case where only the fundamental switching tone is admitted.

The filtered signals from the first and second low pass filters 630 and 632 are provided to a demultiplexer 638 via a first analog to digital converter (ADC) 634 and a second ADC 636 where the filtered signals are converted from analog to digital (Step 708). The digital signals from the first analog to digital converter (ADC) 634 and a second ADC 636 are then demultiplexed by the demultiplexer 638 (Step 710).

The demultiplexer 638 operates to route samples from the first antenna element 602 to a first slot buffer 642 and from the second antenna element 604 to a second slot buffer 644. Thus, the demultiplexor 638 provides separate signals that are representative of the signal replicas received at the first and second antenna elements 602, 604. The buffered samples from the first slot buffer 642 and the second slot buffer 644 are then pulse matched filtered by a first matched filter 650 and a second matched filter 654 respectively (Step 712). After pulse matched filtering, the separate signals from the first and second pulse matched filters 650, 654 are spatially processed by a spatial processing module 660 (Step 714). In one exemplary embodiment, the spatial processing module 660 executes known spatial processing algorithms in the digital domain.

Figure 12A:
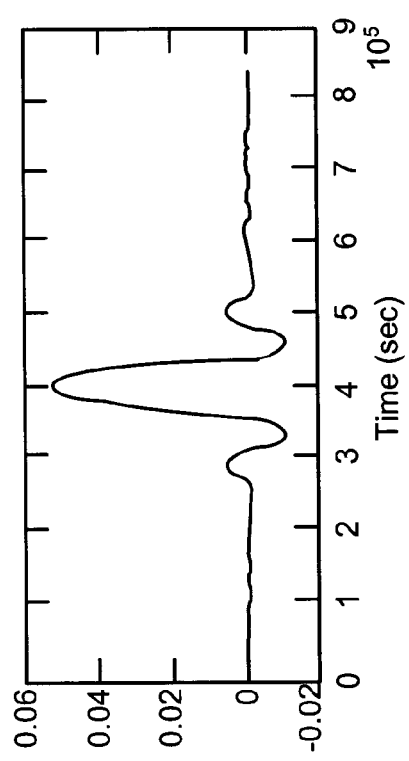
FIGS. 12A and 12B are graphs depicting the pulse shape of an exemplary implementation of the matched filters of the plural-element antenna processing module of FIG. 6 in the time and frequency domain respectively.
Figure 12B:
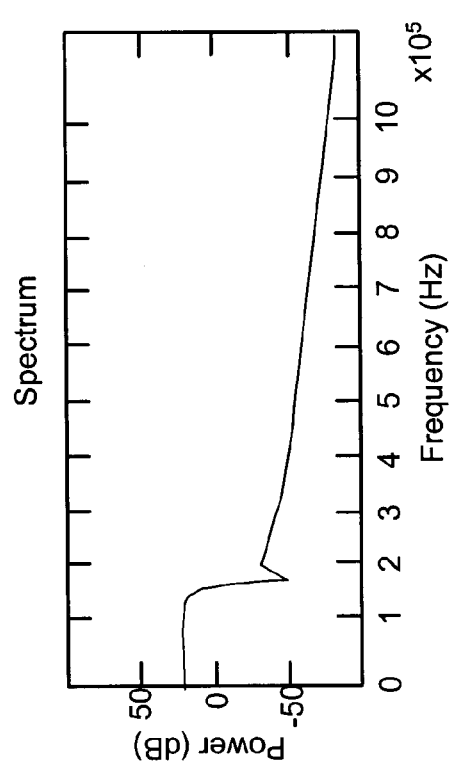
Figure 13A:
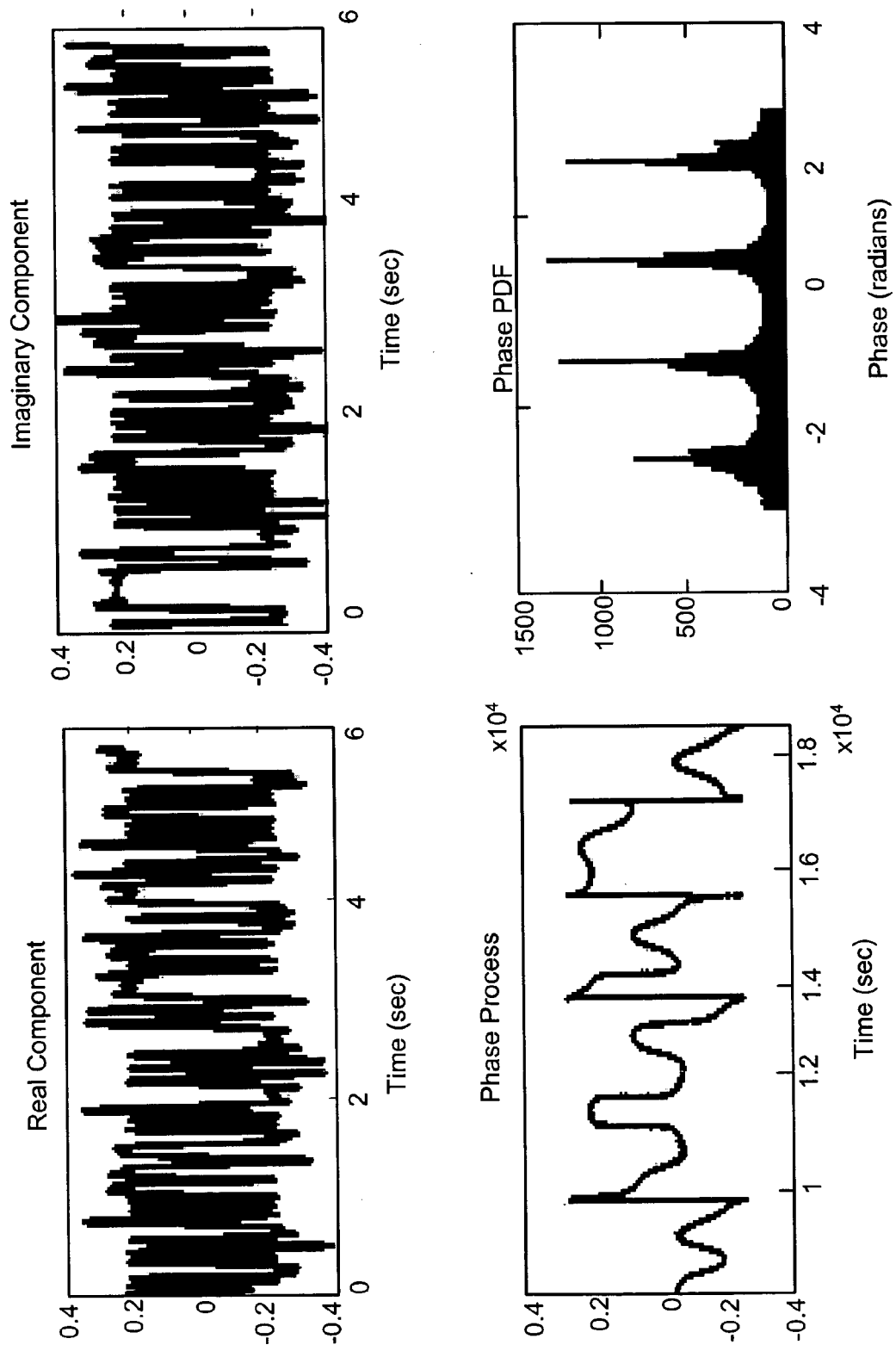
FIGS. 13A and 13B are graphs depicting an output of the matched filters of the plural-element antenna processing module of FIG. 6 in the time and frequency domain respectively.
Figure 13B:
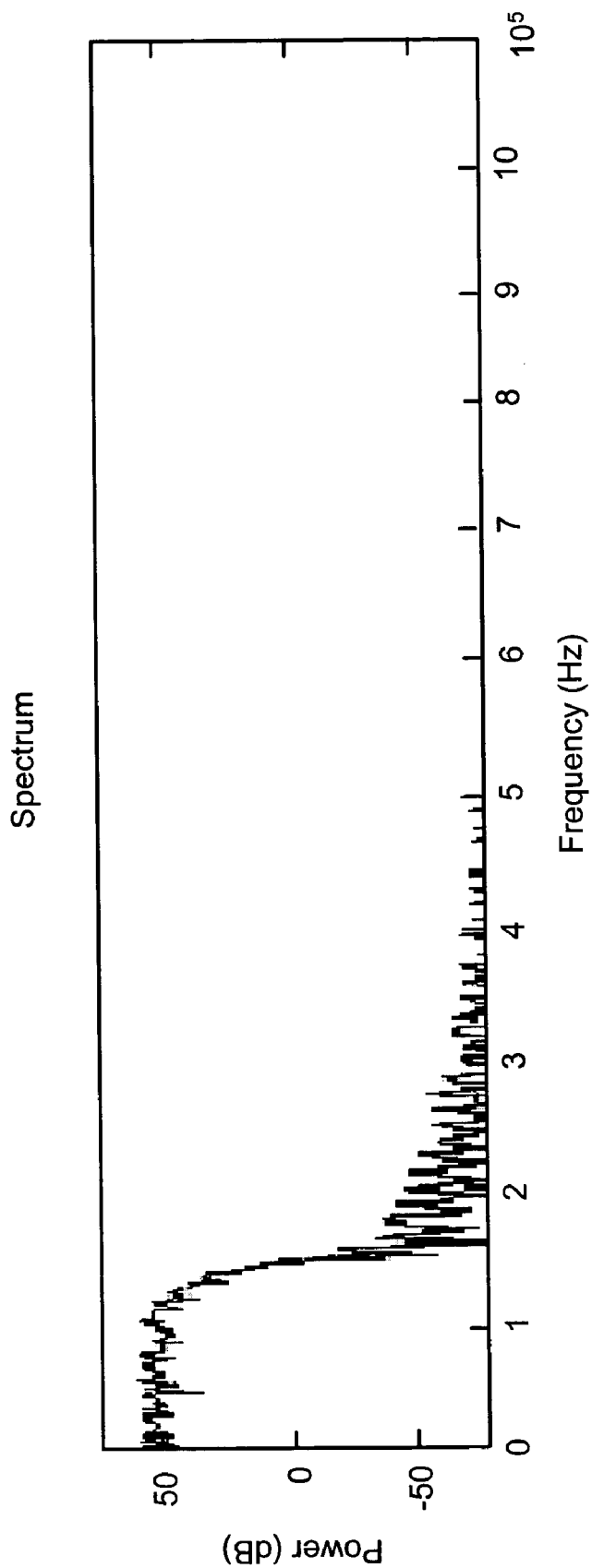

FIGS. 12A and 12B depict a pulse shape of an exemplary implementation of the matched filters 650, 654 in the time and frequency domain respectively. FIGS. 13A and 13B depict the output of the matched filters 650, 654 in both the time and frequency domains.

In one embodiment, the pulse matched filters 650, 654 are not configured to take into consideration discontinuities in the separate demultiplexed signals that are a result of the sampling of the received signals r1(t) and r2(t) during the multiplexing operation effected by the multiplexing switch 608. As the switching frequency fs increases to orders of magnitude greater than the symbol frequency of the received energy, however, any losses incurred during this effective sampling process tend to become negligible.

Figure 14:
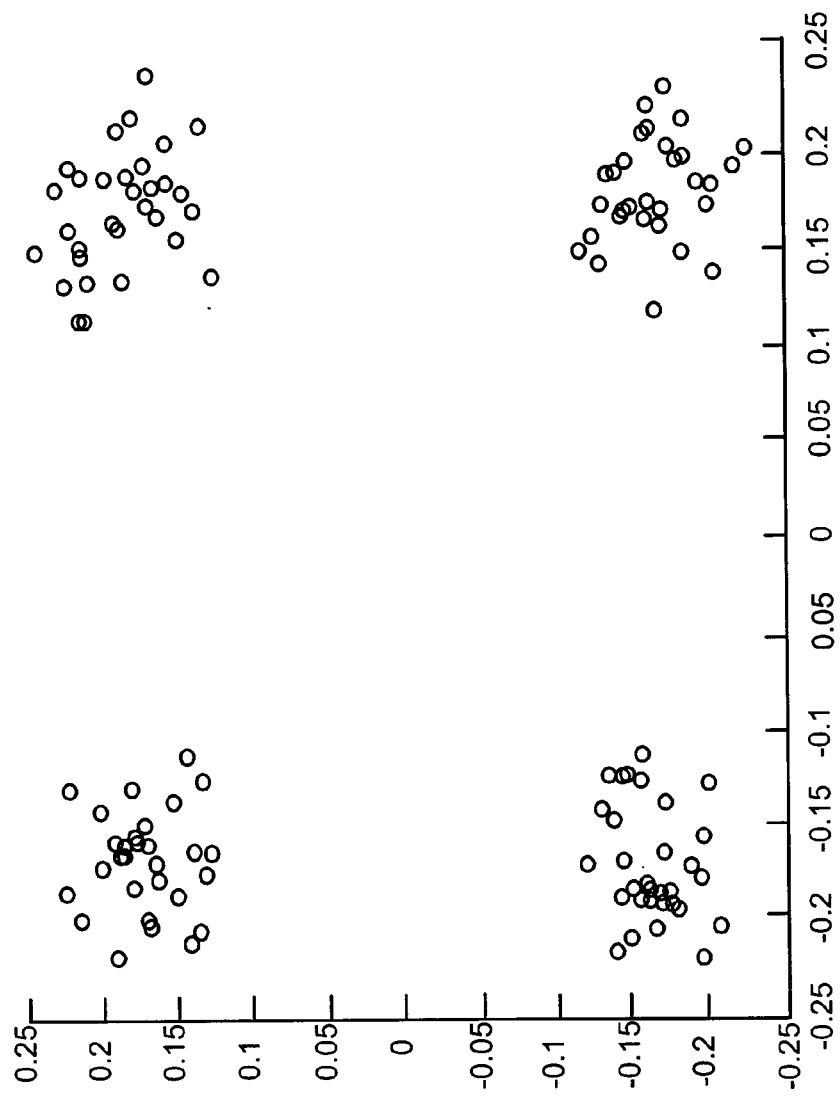
FIG. 14 is a graph depicting a constellation estimate when switching of the plural-element antenna processing module of FIG. 6 is carried out at five switching operations per symbol.
Figure 15:
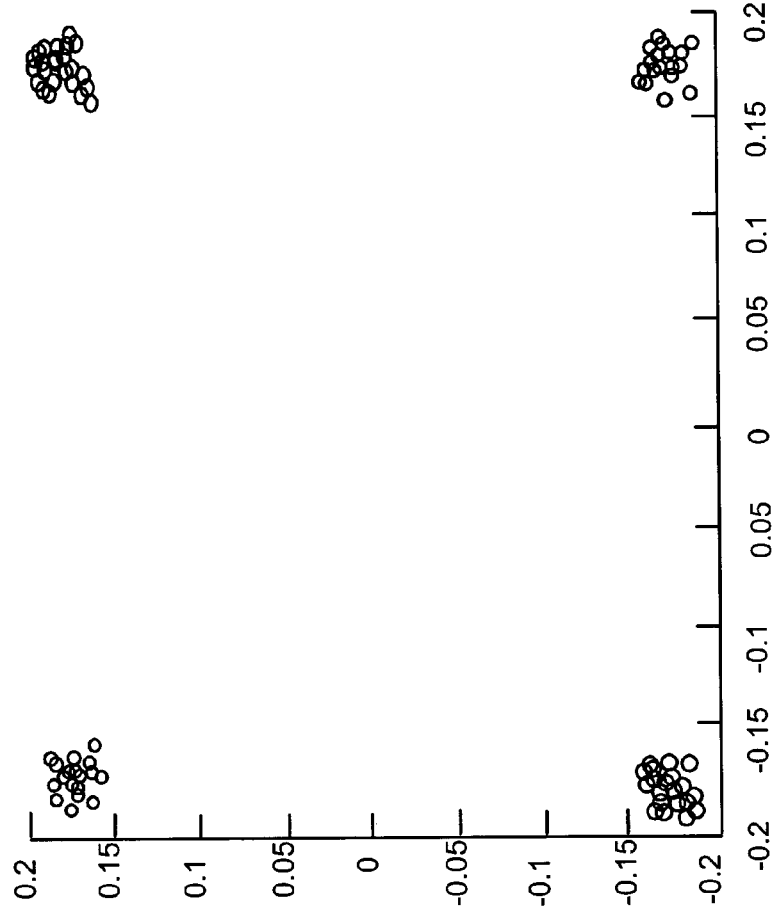
FIG. 15 is a graph depicting another constellation estimate when switching of the plural-element antenna processing module of FIG. 6 is carried out at twenty switching operations per symbol.
Figure 16:
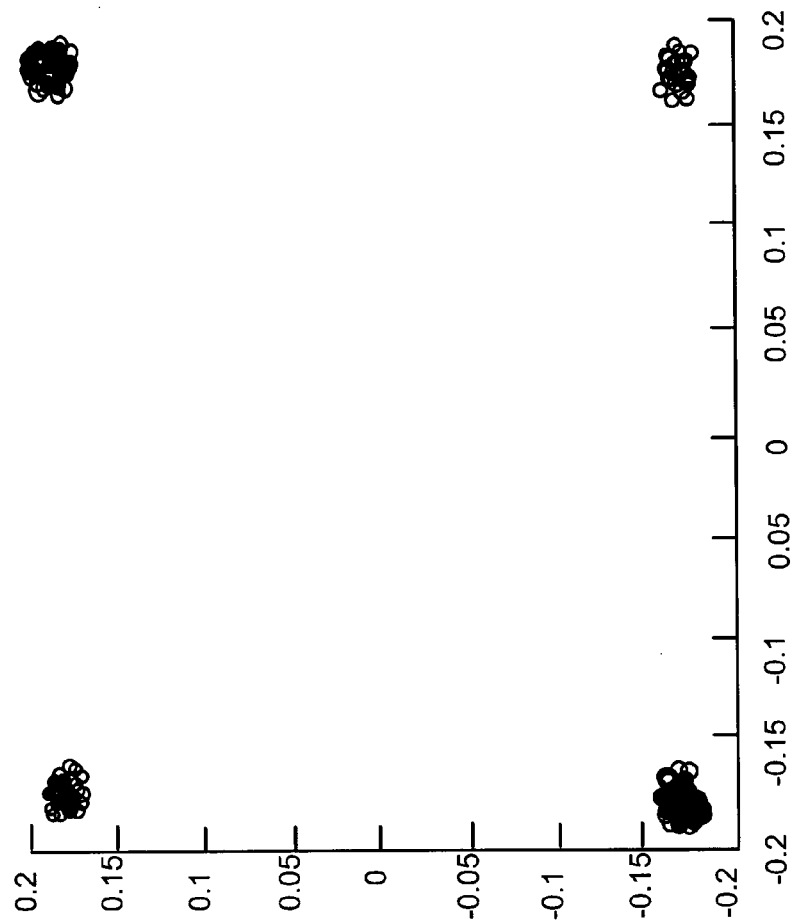
FIG. 16 is a graph depicting yet another constellation estimate when switching of the plural-element antenna processing module of FIG. 6 is carried out at fifty switching operations per symbol.

For example FIGS. 14–16 depict base band constellation estimates generated (in the absence of noise and interference) on the basis of operation at 5, 20 and 50 switching operations per symbol, respectively. As shown, as switching frequency is increased, losses due to the sampling process become negligible.

In other embodiments, the pulse matched filters 650, 654 are configured to take into consideration discontinuities in the separate demultiplexed signals that are a result of the sampling of the received signals r1(t) and r2(t) during the multiplexing operation. The pulse matched filters 650, 654 in these embodiments integrate the buffered samples from the first slot buffer 642 and the second slot buffer 644 (i.e. the separate low pass signals after low pass filtering, demultiplexing and buffering) in order to gather a maximum amount of energy at the sampling instants. This is accomplished by the filters 650, 654 being matched to the separate low pass signals as the complex conjugate of the separate low pass signals.

The signal-to-noise performance of a receiver incorporating a processing module, e.g., the processing module 600 configured with two antenna elements, e.g., the first and second antenna elements 602, 604 has been compared to the performance obtained using a receiver including only a single antenna element. In general, it has been found that the spatial diversity offered by the configuration of the present invention yields superior results in the presence of signal fading. In the case where interferers having linearly independent spatial signatures are in existence, the configuration of the present invention has been found to offer substantial improvements in signal-to-noise performance.

Figure 17:
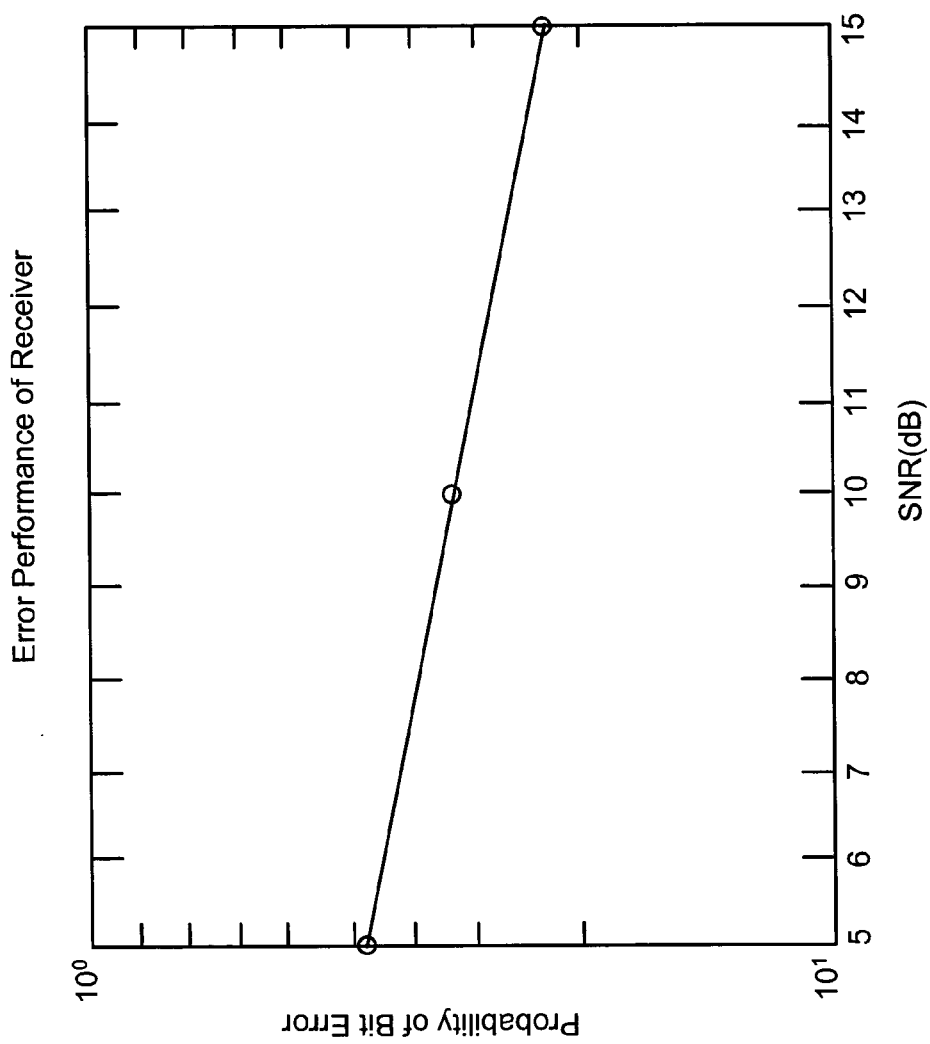
FIG. 17 is a graph depicting an average bit error rate for a single antenna system.
Figure 18:
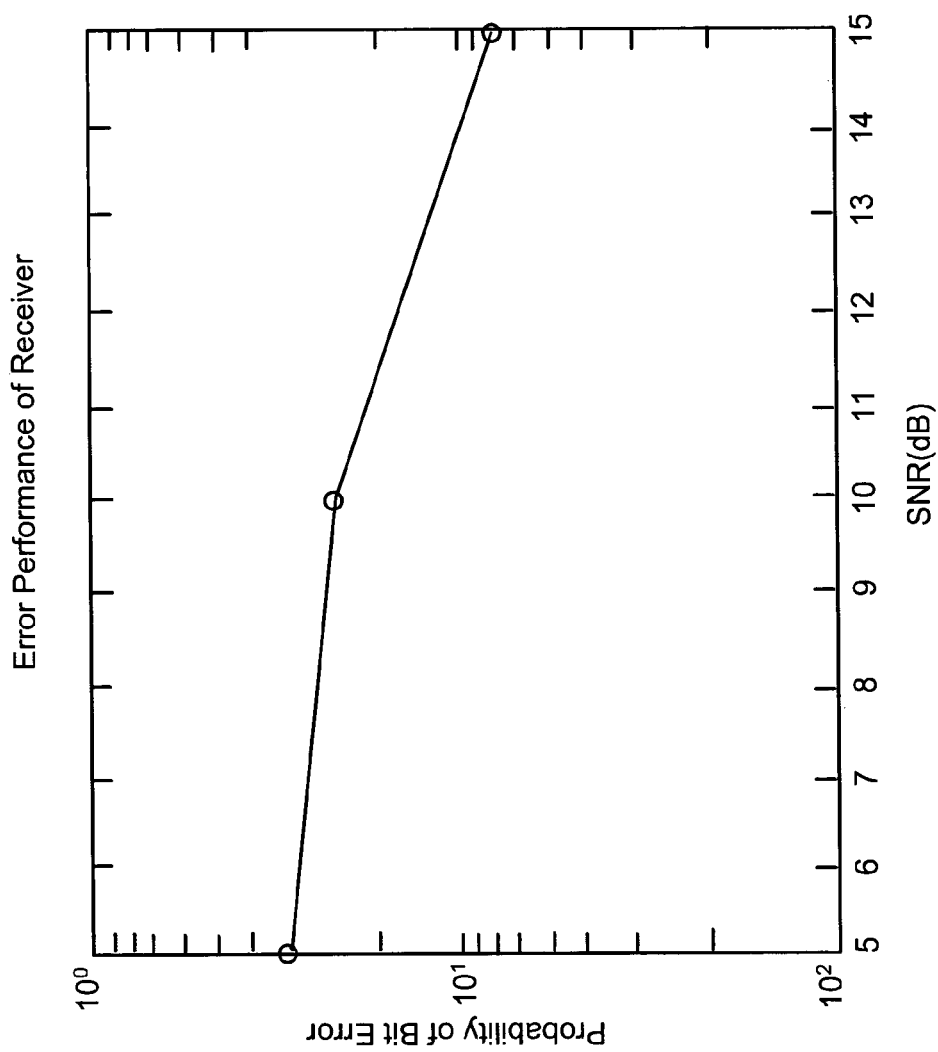
FIG. 18 is a graph depicting an average bit error rate for the antenna processing module of FIG. 6 operative at a switching frequency fs of twenty times (20×) the applicable symbol rate.
Figure 19:
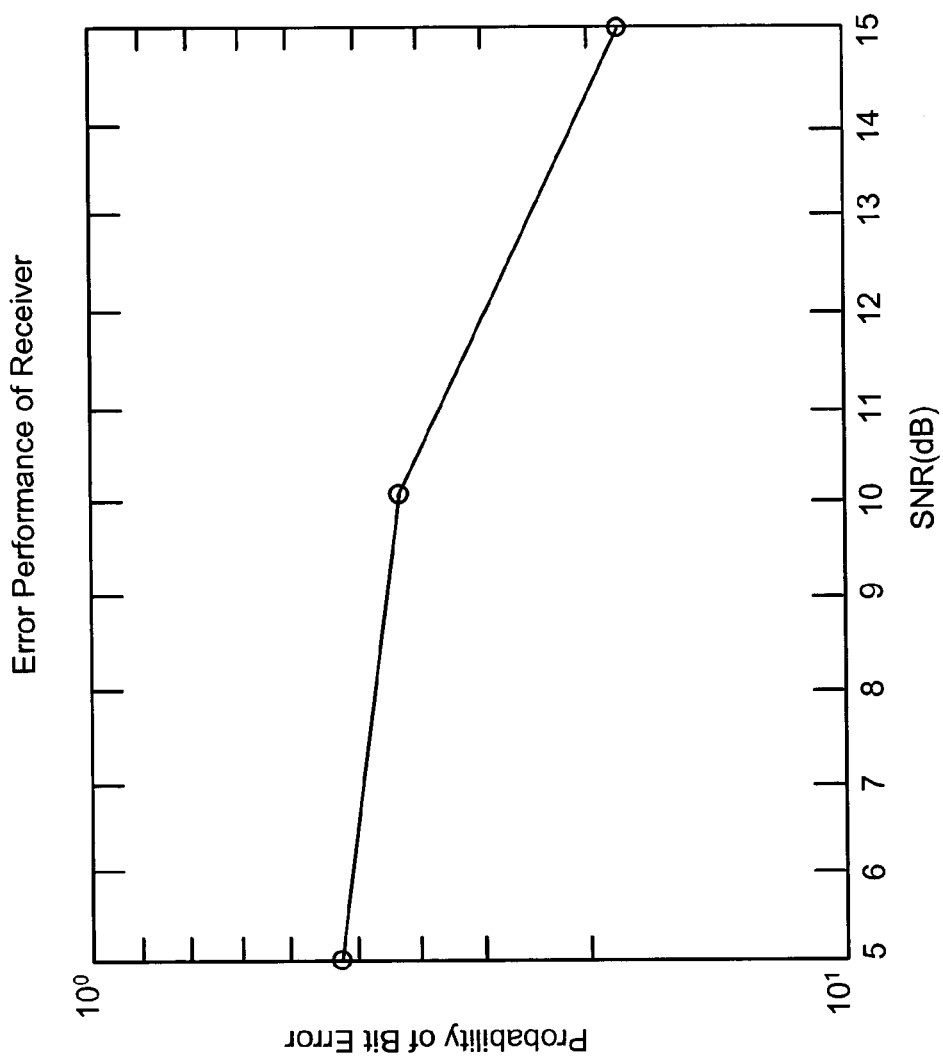
FIG. 19 is a graph depicting an average bit error rate for the antenna processing module of FIG. 6 operative at a switching frequency fs of two times (2×) the applicable symbol rate.

Referring next to FIGS. 17–19, for example, the average error rate is respectively depicted for the simulated cases of (i) a single antenna, (ii) an antenna processing module 600 configured with two antennas and operative at a switching frequency fs of twenty times (20×) the applicable symbol rate, and (iii) an antenna processing module 600 configured with two antennas and operative at a switching frequency fs of two times (2×) the applicable symbol rate.

Referring next to FIG. 18, it is observed that at the moderate switching frequency fs of 20×/symbol a significant advantage is obtained over the single antenna case (FIG. 17). In contrast, FIG. 19 indicates that at a switching frequency fs of 2×/symbol, performance is degraded relative to the case of FIG. 18. Nonetheless, the performance at an fs of 2×/symbol appears to be superior to that of the single antenna case (FIG. 17). It should be noted that appropriate design of each matched filter 650, 654 may substantially reduce or eliminate any difference in performance as a function of switching frequency fs.

Figure 20:
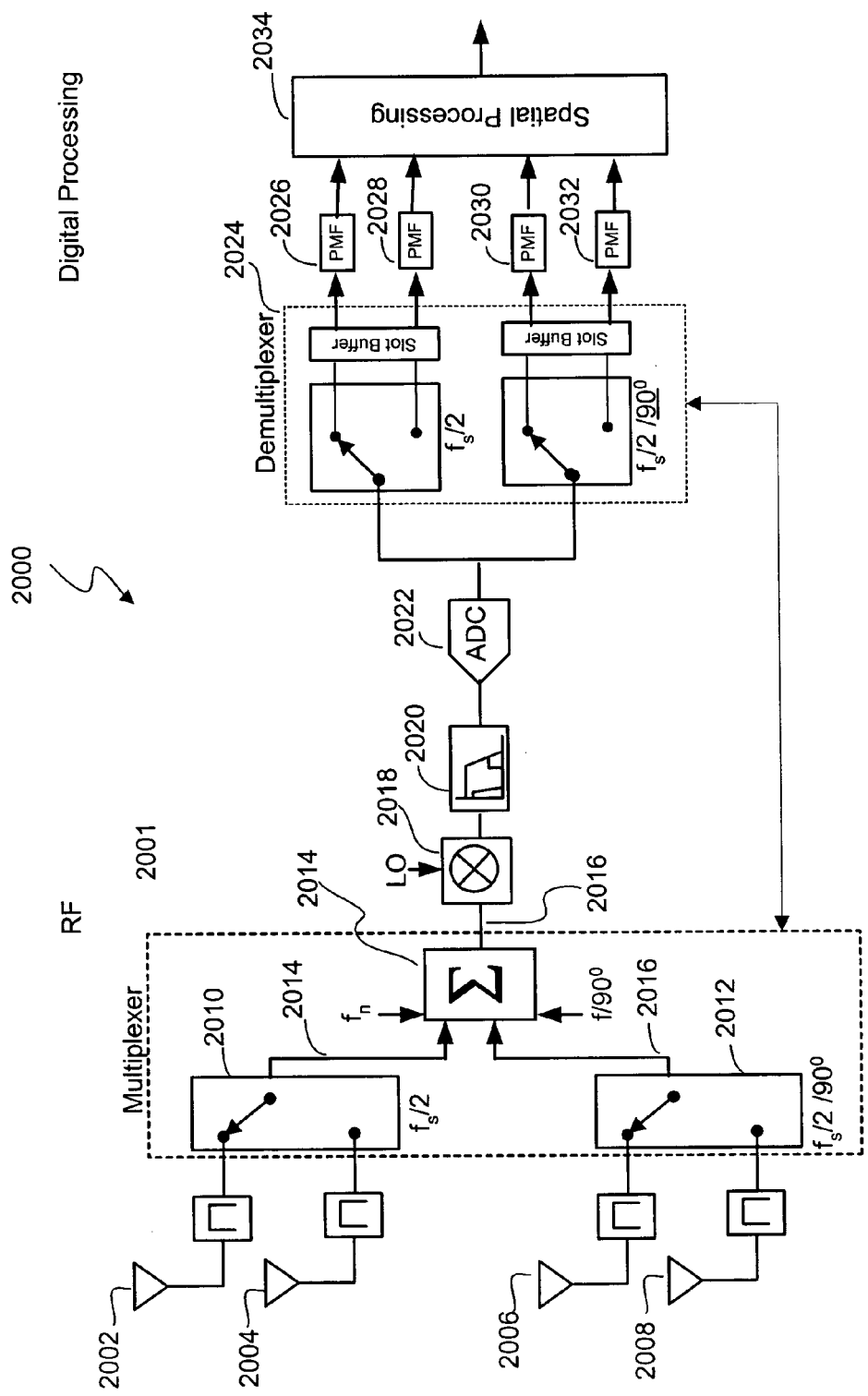
FIG. 20 is another embodiment of an antenna processing module configured to operate with more than two antenna elements.
Figure 21:
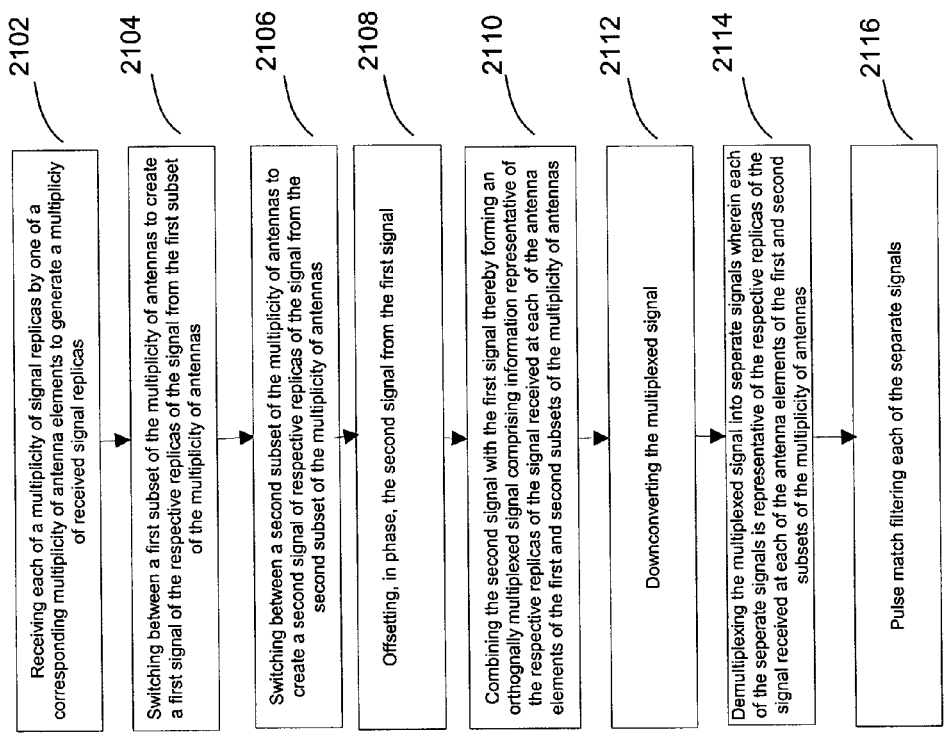
FIG. 21 is a flow chart depicting steps traversed by the plural-element antenna processing module of FIG. 20 when receiving a signal according to one embodiment of the present invention.

Referring next to FIG. 20, shown is another embodiment of an antenna-processing module 2000 configured to operate with more than two antenna elements. As shown, the plural-element antenna processing module 2000 includes a first, a second, a third and a forth antenna elements 2002, 2004, 2006, 2008 coupled to a multiplexer 2001, which is coupled to an RF processing chain 2016. While referring to FIG. 20, simultaneous reference will be made to FIG. 21, which is a flowchart illustrating steps carried out by the antenna-processing module 2000 according to one embodiment of the present invention.

In operation, the antennas 2002, 2004, 2006, 2008 receive a signal at spatially distinct locations, and as a consequence, each of the antennas 2002, 2004, 2006, 2008 receives a respective replica of the signal (Step 2102). In several embodiments, the antennas 2002, 2004, 2006, 2008 are arranged so that each receives an uncorrelated replica of the signal.

In one embodiment, as shown in FIG. 20, the multiplexer 2001 includes a first and second multiplexing switches 2010, 2012, which operate as single-pole double-throw (SPDT) switches. The first and second antennas 2002, 2004 are coupled as a first subset of the four antennas 2002, 2004, 2006, 2008 to the first multiplexing switch 2010 and the third and forth antennas 2006, 2008 are coupled as a second subset of the four antennas 2002, 2004, 2006, 2008 to the second multiplexing switch 2012.

In the present embodiment, the first multiplexing switch 2010 switches between the first and second antenna elements 2002, 2004 at a rate of fs/2 to create a first signal 2014 (Step 2104). Similarly, the second multiplexing switch 2012 switches between the third and forth antenna elements 2006, 2008 at the same rate of fs/2 to create a second signal 2016 (Step 2106). The second signal 2016 is then offset, in phase, from the first signal by 90 degrees (Step 2108).

Figure 22:
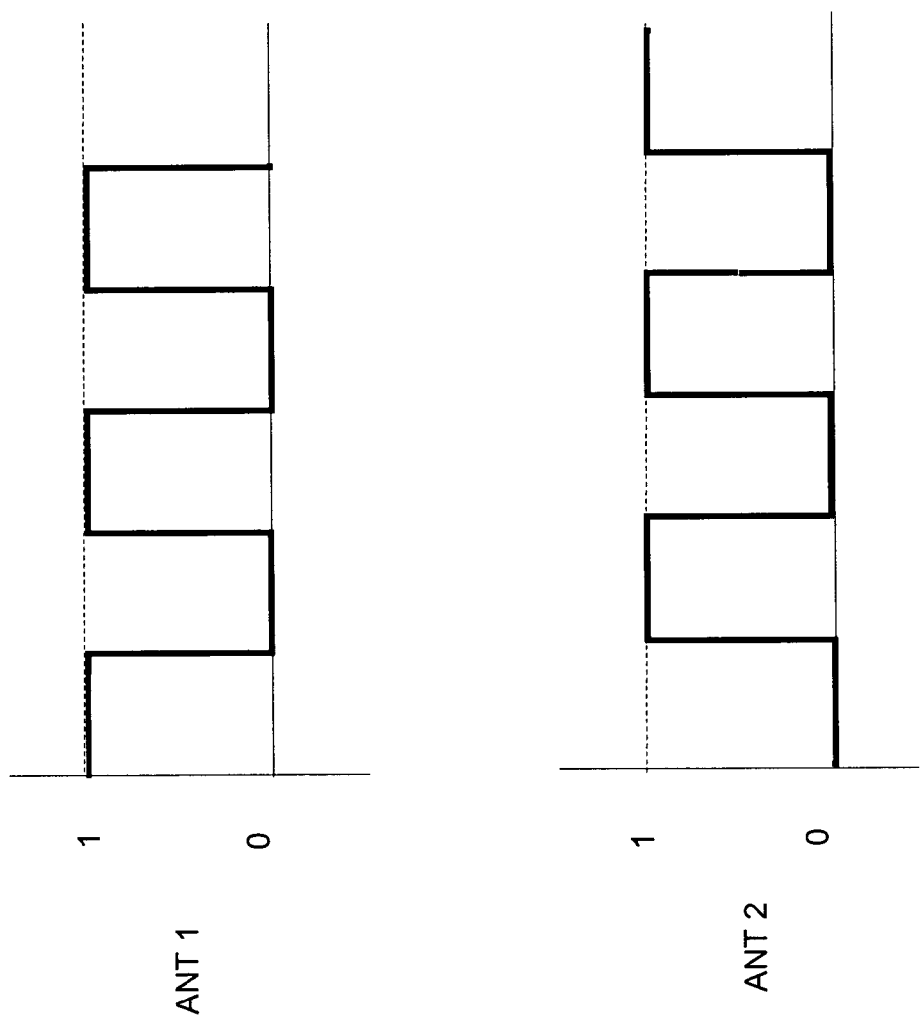
FIG. 22 is a timing diagram of switching signals applied to two of the antenna elements of FIGS. 6 and 21 according to one embodiment.

Referring briefly to FIG. 22, shown are two switching signals utilized, in one embodiment, to perform switching between the first and second antenna elements 2002, 2004 (and between the third and forth antenna elements 2006, 2008) to form the first and second signals 2014, 2016 of FIG. 20 respectively. In this embodiment, formation of the first signal is carried out by multiplying a signal replica received at the first antenna 2002 by a first square wave and multiplying a signal replica received at the second antenna 2004 by a second square wave that is 180 degrees out of phase with the first square wave. The same switching scheme is applied to the second and third antennas to form the second signal, and then, as described above, the second signal 2016 is offset by 90 degrees from the first signal.

Referring briefly to FIG. 23, shown are two switching signals utilized in another embodiment to perform switching between the first and second antenna elements 2002, 2004 and between the third and forth antenna elements 2006, 2008 to form the first and second signals 2014, 2016 of FIG. 20 respectively. As shown in FIG. 23 the two switching signals square waves that are 90 degrees out of phase with each other and both reverse polarity during each cycle.

In this embodiment, formation of the first signal is carried out by multiplying a signal replica received at the first antenna 2002 by the first square wave and multiplying a signal replica received at the second antenna 2004 by the second square wave that is 90 degrees out of phase with the first square wave. This same switching scheme applied to the second and third antennas to form the second signal, and then the second signal 2016 is offset by 90 degrees from the first signal.

Next, the first and second signals 2014, 2016 are combined to form an orthogonally multiplexed signal on a processing chain 2016 (Step 2110). In this way, four antenna elements are multiplexed onto a common receive chain within an identical bandwidth as would be employed for a two-antenna element embodiment. As a consequence, the present embodiment can be implemented with less cost relative to other designs.

For example, relative to a multiplexer comprising a single-pole four-throw switch configured to switch between four antennas, the present embodiment uses half the bandwidth, and as a consequence, the present embodiment is more cost effective.

The multiplexed signal is then downconverted by a mixer device 2018 (Step 2112), and filtered by a low-pass filter 2020 before being converted from analog to digital by a digital converter 2022.

After conversion to a digital representation, the multiplexed signal is then demultiplexed by a demultiplexor 2024 into four separate signals that are each representative of a corresponding replica of the signal as received at a corresponding one of the four antenna elements 2002, 2004, 2006, 2008 (Step 2114). The four separate signals are then pulse matched filtered by respective pulse matched filters 2026, 2028, 2030, 2032 before being received by a spatial processing portion 2034.

Referring next to FIG. 24, shown is yet another embodiment of an antenna processing module 2400 configured to operate with more than two antenna elements. As shown, the plural-element antenna processing module 2400 includes a first, a second, a third and a forth antenna elements 2402, 2404, 2406, 2408 coupled to a multiplexer 2410, which is coupled to an RF processing chain 2016.

In operation, the antennas 2402, 2404, 2406, 2408 receive a signal at spatially distinct locations. As a consequence, each of the antennas 2402, 2404, 2406, 2408 receives a respective replica of the signal. In several embodiments, the antennas 2402, 2404, 2406, 2408 are arranged so that each receives an uncorrelated replica of the signal.

As shown in FIG. 24, the multiplexer 2410 in the present embodiment includes a first, a second, a third and a forth mixing units 2412, 2414, 2416, 2418 that are respectively coupled to the antennas 2402, 2404, 2406, 2408. The mixing units 2412, 2414, 2416, 2418 operate to inject switching signals into each of the signal replicas received at the respective antennas 2402, 2404, 2406, 2408. In several embodiments, the switching signals provided by each of the mixers are orthogonal switching signals.

In one embodiment for example, the switching signals are implemented according to a complex Walsh coding scheme. Referring briefly to FIGS. 25A and 25B, for example, shown are one embodiment of complex Walsh code matrix and a corresponding signal-timing diagram respectively. It should be noted that each element in the complex code matrix of FIG. 25 is a complex number, but in the present embodiment, the imaginary component of each element is zero for sake of simplicity. It should also be noted that in the present embodiment, the elements in the matrix are either 0 or a 1, which correspond to either an "off" or "on" state.

In operation, each row of the complex Walsh matrix is interpreted, e.g., by a CPU (not shown) and a corresponding switching signal is created, as shown in FIG. 25B, that is provided to a corresponding mixing unit 2412, 2414, 2416, 2418. The mixing units 2412, 2414, 2416, 2418 then mix the switching signals with the respective replicas received at the antennas 2402, 2404, 2406, 2408. For example, the first row of the complex Walsh matrix in FIG. 25A is 0, 0, 0, 1, and as a consequence, during a first three switching cycles, as shown in FIG. 25B, the mixer 2412 mixes an "off" signal with the signal replica received at the first antenna 2402.

Referring to FIGS. 26A and 26B, shown are another embodiment of complex Walsh code matrix and a corresponding signal-timing diagram respectively. As shown in FIG. 26A, the elements of the complex Walsh code matrix are either a 1 or a −1, and as a result, corresponding signals, as shown in FIG. 26B, (in some instances) reverse polarity from cycle to cycle. As a consequence, there are fewer harmonics produced when mixing the signals shown in FIG. 26B relative to the signals shown in FIG. 25B.

After the signal replicas from the antennas 2402, 2404, 2406, 2408 are mixed by respective switching signals, e.g., the switching signals described with reference to FIGS. 25B and 26B, the coded signal replicas 2420, 2422, 2424, 2426 are then combined by a signal combiner 2428 to produce an orthogonally multiplexed signal on the processing chain 2430.

Figure 7:
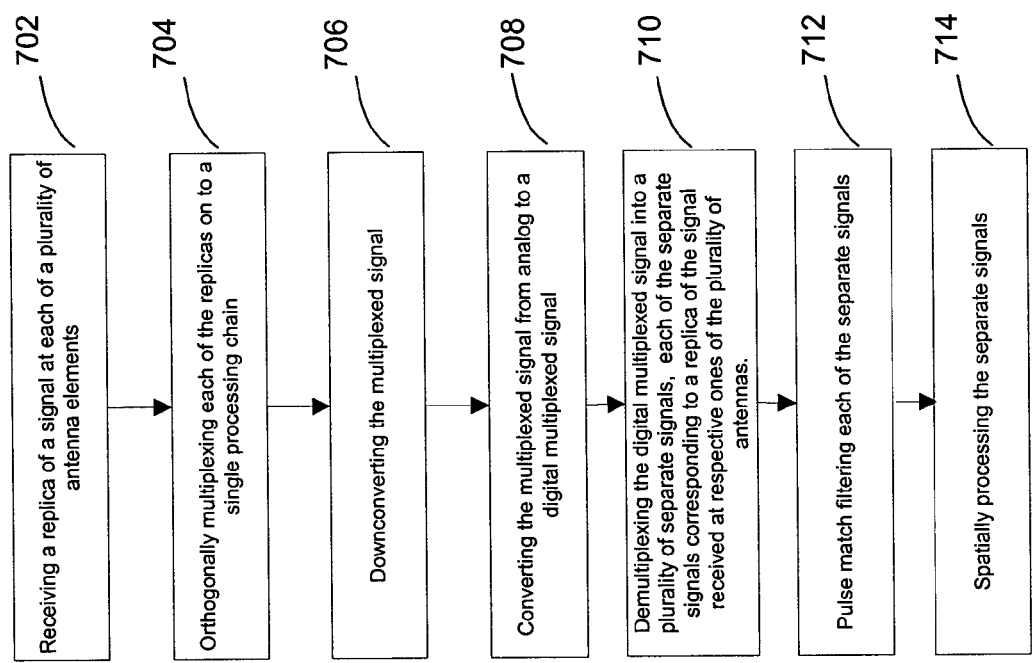
FIG. 7 is a flow chart depicting steps traversed by the plural-element antenna processing module of FIG. 6 when receiving a signal according to one embodiment of the present invention.

It should be noted that the orthogonal multiplexing scheme of the present embodiment is one embodiment of carrying out Step 704 of FIG. 7.

After multiplexing, in some embodiments, the multiplexed signal is down converted by a mixer 2430, filtered by a low pass filter 2432, converted to a digital signal by an analog to digital converter 2434 and then demultiplexed, by a demultiplexor 2436 into four representations of the original signal replicas received at the antennas 2402, 2404, 2406, 2408. The separate signals are then pulse match filtered by respective pulse matched filters 2438, 2440, 2442, 2444 before being spatially processed by a spatial processing unit 2446.

The described and other embodiments could be implemented in systems including, but not limited to time division multiple access (TDMA), code division multiple access (CDMA), frequency division multiple access (FDMA), orthogonal frequency division multiple access (OFDM), or any combination of these. This could also include systems using any type of modulation to encode the digital data.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for receiving a signal comprising:
   receiving a plurality of replicas of the signal, each of the plurality of replicas being received by one of a corresponding plurality of antenna elements so as to thereby generate a plurality of received signal replicas;
   orthogonally multiplexing the plurality of received signal replicas into a multiplexed signal provided to a single processing chain; and
   transforming, within the single processing chain, the multiplexed signal into a plurality of separate signals wherein each of the plurality of separate signals corresponds to one of the replicas of the signal.

2. The method of claim 1 wherein the transforming comprises frequency downconverting the multiplexed signal, thereby generating a downconverted multiplexed signal.

3. The method of claim 2, comprising converting the downconverted multiplexed signal to a digital multiplexed signal.

4. The method of claim 3, comprising demultiplexing the digital multiplexed signal into the plurality of separate signals.

5. The method of claim 1, wherein the orthogonally multiplexing comprises frequency spreading the plurality of replicas on to the single processing chain according to an orthogonal coding scheme.

6. The method of claim 5, wherein the frequency spreading is carried out according to a Walsh coding scheme.

7. The method of claim 6, wherein the frequency spreading is carried out according to a complex Walsh coding scheme.

8. The method of claim 1, wherein the orthogonally multiplexing comprises offsetting, by ninety degrees in phase, one of the plurality of replicas from another one of the plurality of replicas.

9. The method of claim 8, comprising:
   multiplying the other one of the plurality of replicas by a first square wave;
   multiplying the one of the plurality of replicas by a second square wave offset in phase from the first square wave by ninety degrees.

10. The method of claim 9, wherein the first and second square waves reverse polarity during each cycle.

11. The method of claim 1, comprising:
    pulse match filtering each of the separate signals.

12. The method of claim 1, wherein the receiving comprises receiving the plurality of replicas of the signal as uncorrelated replicas of the signal.

13. The method of claim 1, wherein the orthogonally multiplexing the plurality of replicas comprises:
    switching between a first subset of the plurality of antenna elements to create a first signal of respective replicas of the signal from the first subset of the plurality of antenna elements;
    switching between a second subset of the plurality of antenna elements to create a second signal of respective replicas of the signal from the second subset of the plurality of antenna elements;
    offsetting, in phase, the second signal from the first signal; and
    combining the second signal with the first signal thereby forming the multiplexed signal.

14. A method for receiving a signal comprising:
    receiving a multiplicity of replicas of the signal, each of the multiplicity of replicas being received by one of a corresponding multiplicity of antenna elements so as to thereby generate a multiplicity of received signal replicas;
    switching signal energy from among ones of a first subset of the multiplicity of antenna elements to create a first signal comprising signal energy from each of the ones of the first subset of the multiplicity of antenna elements;
    switching signal energy from among ones of a second subset of the multiplicity of antenna elements to create a second signal comprising signal energy from each of the ones of the second subset of the multiplicity of antenna elements;
    offsetting, in phase, the second signal from the first signal;
    combining the second signal with the first signal, thereby forming a multiplexed signal comprising information representative of each respective replica of the signal; and transforming, within a single processing chain, the multiplexed signal into separate signals wherein each of the separate signals corresponds to one of the replicas of the signal.

15. The method of claim 14, wherein the transforming comprises frequency downconverting the multiplexed signal, thereby generating a downconverted multiplexed signal.

16. The method of claim 15, comprising converting the downconverted multiplexed signal to a digital multiplexed signal.

17. The method of claim 16, comprising demultiplexing the digital multiplexed signal into the separate signals.

18. The method of claim 14, wherein the switching signal energy from among ones of a first subset of the multiplicity of antenna elements comprises switching between a first pair of the multiplicity of antenna elements to create the first signal, wherein the switching signal energy from among ones of a second subset of the multiplicity of antenna elements comprises switching between a second pair of the multiplicity of antenna elements to create the second signal.

19. The method of claim 18, wherein the switching between the first pair of the multiplicity of antenna elements comprises multiplying each respective replica of the signal at each of the first pair of the multiplicity of antenna elements by respective square waves wherein each of the respective square waves are out of phase by 180 degrees.

20. The method of claim 19, wherein the respective square waves reverse polarity during each cycle.

21. The method of claim 18, wherein the switching between the first pair of the multiplicity of antenna elements comprises multiplying each respective replica of the signal at each of the first pair of the multiplicity of antenna elements by respective square waves wherein each of the respective square waves are out of phase by 90 degrees.

22. The method of claim 21, wherein the respective square waves reverse polarity during each cycle.

23. An apparatus for receiving a signal comprising:
a plurality of antenna elements, wherein the plurality of antenna elements are spatially arranged to receive one of a corresponding plurality of replicas of the signal so as to be capable of generating a plurality of received signal replicas;
a signal processing chain; and
an orthogonal multiplexer, coupled between the plurality of antenna elements and the signal processing chain, wherein the orthogonal multiplexor is configured to receive the plurality of received signal replicas and orthogonally multiplex the plurality of received signal replicas as a multiplexed signal on to the signal processing chain;
wherein the signal processing chain includes a demultiplexer configured to transform the multiplexed signal into a plurality of separate signals, wherein each of the plurality of separate signals corresponds to one of the replicas of the signal.

24. The apparatus of claim 23, wherein the orthogonal multiplexer comprises:
a first switch coupled to a first subset of the plurality of antenna elements wherein the first switch is configured to switch between a first subset of the plurality of antenna elements to create, at an output of the first switch, a first signal of respective replicas of the signal from the first subset of the plurality of antenna elements;
a second switch coupled to a second subset of the plurality of antenna elements wherein the second switch is configured to switch between a second subset of the plurality of antenna elements to create, at an output of the second switch, a second signal of respective replicas of the signal from the second subset of the plurality of antenna elements;
a phase offsetting portion coupled to the output of the second switch wherein the phase offsetting portion is configured to generate, at an offsetting output, an offset signal wherein the offset signal is offset in phase from the first signal; and
a signal combiner coupled to the output of the first switch and the offsetting output and configured to receive and combine the first signal and the offset signal to form the multiplexed signal on the signal processing chain.

25. The apparatus of claim 24, wherein the first and second switches are single-pole double-throw switches.

26. The apparatus of claim 23, wherein the orthogonal multiplexer comprises:
a plurality of mixers configured to provided a plurality of mixed signals, wherein each of the plurality of mixers is coupled to one of the plurality of antenna elements, wherein each mixer is configured to generate one of the plurality of mixed signals by mixing one of a plurality of orthogonal switching signals with the one of the corresponding plurality of replicas of the signal received at each of the plurality of antenna elements; and
a combiner coupled the plurality of mixers and configured to receive and combine the plurality of mixed signals thereby forming the multiplexed signal.

27. The apparatus of claim 23, wherein the signal processing chain comprises:
a downconverting mixer coupled to the orthogonal mixer, wherein the downconverting mixer is configured to downconvert the multiplexed signal into a downconverted multiplexed signal.

28. The apparatus of claim 27, wherein the signal processing chain comprises:
an analog to digital converter coupled to the downconverting mixer, wherein the analog to digital converter is configured to convert the downconverted multiplexed signal into a digital multiplexed signal, wherein the demultiplexer is configured to transform the digital multiplexed signal into the plurality of separate signals.

29. An apparatus for receiving a signal comprising:
means for receiving a plurality of replicas of the signal;
a signal processing chain;
means for orthogonally multiplexing the plurality of received signal replicas into a multiplexed signal provided to the signal processing chain; and
means for transforming, within the signal processing chain, the multiplexed signal into a plurality of separate signals wherein each of the plurality of separate signals corresponds to one of the replicas of the signal.

30. The apparatus of claim 29, wherein the means for transforming comprises means for frequency downconverting the multiplexed signal into a downconverted multiplexed signal.

31. The apparatus of claim 30, comprising means for converting the downconverted multiplexed into a digital multiplexed signal.

32. The apparatus of claim 31, comprising means for demultiplexing the digital multiplexed signal into the plurality of separate signals.

33. The apparatus of claim 29, wherein the means for orthogonally multiplexing comprises means for frequency spreading the plurality of replicas on to the signal processing chain according to an orthogonal coding scheme.

34. The apparatus of claim 33, wherein the means for frequency spreading comprises means for carrying out frequency spreading according to a Walsh coding scheme.

35. The apparatus of claim 34, wherein the means for frequency spreading comprises means for carrying out the frequency spreading according to a complex Walsh coding scheme.

36. The apparatus of claim 29, wherein the means for orthogonally multiplexing comprises means for offsetting, by ninety degrees in phase, one of the plurality of replicas from another one of the plurality of replicas.

37. The apparatus of claim 36, comprising:
means for multiplying the other one of the plurality of replicas by a first square wave; and
means for multiplying the one of the plurality of replicas by a second square wave offset in phase from the first square wave by ninety degrees.

38. The apparatus of claim 37, wherein the means for multiplying the other one and the means for multiplying the one comprise respective means for multiplying the other one and the one of the plurality of replicas by the first square wave first and second square waves wherein the first and second square waves reverse polarity during each cycle.

39. The apparatus of claim 29, comprising:
means for pulse match filtering each of the separate signals.

40. The apparatus of claim 29, wherein the means for receiving comprises means for receiving the plurality of replicas of the signal as uncorrelated replicas of the signal.

41. The apparatus of claim 29, wherein the means for orthogonally multiplexing the plurality of replicas comprises:
means for switching between a first subset of the plurality of antenna elements to create a first signal of respective replicas of the signal from the first subset of the plurality of antenna elements;
means for switching between a second subset of the plurality of antenna elements to create a second signal of respective replicas of the signal from the second subset of the plurality of antenna elements;
means for offsetting, in phase, the second signal from the first signal; and
means for combining the second signal with the first signal thereby forming the multiplexed signal.

42. A method for orthogonally multiplexing a signal, comprising:
generating a plurality of orthogonal signals;
multiplying each of the plurality of orthogonal signals by one of a corresponding plurality of replicas of the signal so as to thereby generate a plurality of coded signal replicas, wherein each of the plurality of replicas of the signal is received by one of a corresponding plurality of antenna elements; and
combining the plurality of coded signal replicas to form an orthogonally multiplexed signal.

43. The method of claim 42, wherein the generating comprises generating the plurality of orthogonal signals according to a Walsh coding scheme.

44. The method of claim 42, wherein the generating comprises generating at least two of the orthogonal signals as orthogonal signals that reverse polarity during each cycle.

45. The method of claim 1, wherein the signal complies with a communication protocol selected from the group consisting of: orthogonal frequency division multiplexing (OFDM), time division multiple access (TDMA), code division multiple access (CDMA), gaussian minimum shift keying (GMSK), complementary code keying (CCK), quadrature phase shift keying (QPSK), frequency shift keying (FSK), phase shift keying (PSK), and quadrature amplitude modulation (QAM).

* * * * *